US012177635B2

(12) United States Patent
Rappoport

(10) Patent No.: US 12,177,635 B2
(45) Date of Patent: Dec. 24, 2024

(54) PLAYBACK DEVICE BASE

(71) Applicant: Sonos, Inc., Santa Barbara, CA (US)

(72) Inventor: Benjamin Rappoport, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 128 days.

(21) Appl. No.: 18/064,379

(22) Filed: Dec. 12, 2022

(65) Prior Publication Data

US 2023/0292068 A1 Sep. 14, 2023

Related U.S. Application Data

(63) Continuation of application No. 16/944,797, filed on Jul. 31, 2020, now Pat. No. 11,528,570, which is a (Continued)

(51) Int. Cl.

*H04R 27/00* (2006.01)
*H04H 20/18* (2008.01)
*H04S 7/00* (2006.01)

(52) U.S. Cl.

CPC ............. *H04R 27/00* (2013.01); *H04H 20/18* (2013.01); *H04R 2227/005* (2013.01); *H04R 2420/07* (2013.01); *H04S 7/30* (2013.01)

(58) Field of Classification Search

CPC .... H04R 27/00; H04R 3/04; H04R 2227/005; H04R 2420/07; H04S 7/30; H04S 7/301;

(Continued)

(56) References Cited

U.S. PATENT DOCUMENTS 4,696,037 A 9/1987 Fierens
5,440,644 A 8/1995 Farinelli et al.

(Continued)

FOREIGN PATENT DOCUMENTS

EP 1389853 A1 2/2004
EP 2180727 A2 4/2010

(Continued)

OTHER PUBLICATIONS

Notice of Allowance mailed on Nov. 16, 2016, issued in connection with U.S. Appl. No. 14/803,094, filed Jul. 19, 2015, 7 pages.

(Continued)

*Primary Examiner* — Norman Yu
(74) *Attorney, Agent, or Firm* — Akerman LLP

(57) ABSTRACT

Example techniques may involve a playback device modifying its playback configuration when the playback device is placed onto a device base. In an example implementation, the playback device may receive, via an 802.15-compatible radio of one or more network interfaces, one or more packets comprising data representing an identifier of the first device base. After receipt of the one or more packets, the playback device queries a database for state information corresponding to the identifier of the first device base and modifies a playback configuration of the playback device from a first configuration to a second configuration based on the queried state information corresponding to the identifier of the first device base.

20 Claims, 12 Drawing Sheets

Related U.S. Application Data continuation of application No. 16/367,808, filed on Mar. 28, 2019, now Pat. No. 10,735,878, which is a continuation of application No. 16/180,952, filed on Nov. 5, 2018, now Pat. No. 10,264,376, which is a continuation of application No. 15/688,137, filed on Aug. 28, 2017, now Pat. No. 10,129,673, which is a continuation of application No. 15/357,548, filed on Nov. 21, 2016, now Pat. No. 9,749,761, which is a continuation of application No. 14/803,094, filed on Jul. 19, 2015, now Pat. No. 9,544,701.

(58) Field of Classification Search
CPC ............ H04S 7/305; H04S 7/307; H04S 7/00; H04H 20/18; G06F 3/165
USPC .......... 381/103, 58, 311, 59, 81, 82, 98, 300
See application file for complete search history.

(56) References Cited

U.S. PATENT DOCUMENTS

| | | | |
|---|---|---|---|
| 5,553,147 | A | 9/1996 | Pineau |
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 6,809,635 | B1 | 10/2004 | Kaaresoja |
| 6,882,335 | B2 | 4/2005 | Saarinen |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,311,526 | B2 | 12/2007 | Rohrbach et al. |
| 7,483,538 | B2 | 1/2009 | McCarty et al. |
| 7,494,098 | B1 | 2/2009 | Fulda |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,090,317 | B2 | 1/2012 | Burge et al. |
| 8,103,009 | B2 | 1/2012 | McCarty et al. |
| 8,214,447 | B2 | 7/2012 | Deslippe et al. |
| 8,234,395 | B2 | 7/2012 | Millington |
| 8,326,951 | B1 | 12/2012 | Millington et al. |
| 8,483,853 | B1 | 7/2013 | Lambourne |
| 8,788,080 | B1 | 7/2014 | Kallai et al. |
| 8,867,776 | B2 | 10/2014 | Schul |
| 8,903,526 | B2 | 12/2014 | Beckhardt et al. |
| 8,910,265 | B2 | 12/2014 | Lang et al. |
| 8,995,240 | B1 | 3/2015 | Erven et al. |
| 9,042,556 | B2 | 5/2015 | Kallai et al. |
| 9,137,564 | B2 | 9/2015 | Reimann |
| 9,213,762 | B1 | 12/2015 | Erven et al. |
| 9,223,862 | B2 | 12/2015 | Beckhardt |
| 9,226,072 | B2 | 12/2015 | Bender et al. |
| 9,232,277 | B2 | 1/2016 | Vega-Zayas et al. |
| 9,247,492 | B2 | 1/2016 | Millington et al. |
| 9,285,886 | B2 | 3/2016 | Reilly et al. |
| 9,286,384 | B2 | 3/2016 | Kuper et al. |
| 9,300,647 | B2 | 3/2016 | Triplett |
| 9,329,831 | B1 | 5/2016 | Fullerton et al. |
| 9,330,096 | B1 | 5/2016 | Fullerton et al. |
| 9,361,371 | B2 | 6/2016 | Coburn, IV et al. |
| 9,374,607 | B2 | 6/2016 | Bates et al. |
| 9,450,446 | B2 | 9/2016 | Baker et al. |
| 9,460,755 | B2 | 10/2016 | Coburn, IV |
| 9,501,533 | B2 | 11/2016 | Coburn, IV et al. |
| 9,544,701 | B1 | 1/2017 | Rappoport |
| 9,554,201 | B2 | 1/2017 | Williams et al. |
| 9,560,449 | B2 | 1/2017 | Carlsson et al. |
| 9,608,475 | B1 | 3/2017 | Karanikos et al. |
| 9,665,339 | B2 | 5/2017 | Reimann et al. |
| 9,671,997 | B2 | 6/2017 | Triplett |
| 9,686,282 | B2 | 6/2017 | Pollock |
| 9,715,365 | B2 | 7/2017 | Kusano et al. |
| 9,735,978 | B2 | 8/2017 | Kumar et al. |
| 9,820,039 | B2 | 11/2017 | Lang |
| 9,826,306 | B2 | 11/2017 | Lang |
| 9,952,825 | B2 | 4/2018 | Sheen |
| 9,961,463 | B2 | 5/2018 | Wilberding et al. |
| 10,001,965 | B1 | 6/2018 | Lang et al. |
| 10,003,881 | B2 | 6/2018 | Cousins et al. |
| 10,114,605 | B2 | 10/2018 | Gossain et al. |
| 10,209,947 | B2 | 2/2019 | Morganstern et al. |
| 10,275,138 | B2 | 4/2019 | Vega et al. |
| 10,462,505 | B2 | 10/2019 | Coburn, IV et al. |
| 10,483,786 | B2 | 11/2019 | Moussaoui et al. |
| 10,587,693 | B2 | 3/2020 | Beckhardt |
| 10,715,973 | B2 | 7/2020 | Kumar et al. |
| 11,200,024 | B2 | 12/2021 | Lang et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2002/0127812 | A1 | 9/2002 | Matsunaga et al. |
| 2003/0157951 | A1 | 8/2003 | Hasty, Jr. |
| 2004/0024478 | A1 | 2/2004 | Hans et al. |
| 2005/0201549 | A1 | 9/2005 | Dedieu et al. |
| 2005/0286546 | A1 | 12/2005 | Bassoli et al. |
| 2007/0003067 | A1 | 1/2007 | Gierl et al. |
| 2007/0021137 | A1 | 1/2007 | Kokkonen et al. |
| 2007/0038999 | A1 | 2/2007 | Millington |
| 2007/0142944 | A1 | 6/2007 | Goldberg et al. |
| 2007/0265031 | A1 | 11/2007 | Koizumi et al. |
| 2008/0144864 | A1 | 6/2008 | Huon et al. |
| 2008/0146289 | A1 | 6/2008 | Korneluk et al. |
| 2009/0164600 | A1 | 6/2009 | Issa et al. |
| 2009/0168760 | A1 | 7/2009 | Katis et al. |
| 2009/0171487 | A1 | 7/2009 | Wilhelm |
| 2009/0217036 | A1 | 8/2009 | Irwin et al. |
| 2009/0312849 | A1 | 12/2009 | Cosgrove et al. |
| 2011/0002487 | A1 | 1/2011 | Panther et al. |
| 2011/0289157 | A1 | 11/2011 | Pirnazar |
| 2012/0051567 | A1* | 3/2012 | Castor-Perry ........ H04R 29/002 381/304 |
| 2012/0206319 | A1 | 8/2012 | Lucero et al. |
| 2012/0317487 | A1 | 12/2012 | Lieb et al. |
| 2013/0129122 | A1 | 5/2013 | Johnson et al. |
| 2013/0216071 | A1* | 8/2013 | Maher ..................... H04S 7/301 381/303 |
| 2013/0248678 | A1 | 9/2013 | Kramer |
| 2013/0305152 | A1 | 11/2013 | Griffiths et al. |
| 2013/0316686 | A1 | 11/2013 | Subbaramoo et al. |
| 2013/0331970 | A1 | 12/2013 | Beckhardt et al. |
| 2014/0006587 | A1 | 1/2014 | Kusano |
| 2014/0030980 | A1 | 1/2014 | D'Ambrosio |
| 2014/0192986 | A1 | 7/2014 | Lee et al. |
| 2014/0195587 | A1 | 7/2014 | Sukoff et al. |
| 2014/0229959 | A1 | 8/2014 | Beckhardt et al. |
| 2014/0230015 | A1 | 8/2014 | Pollock |
| 2014/0270284 | A1 | 9/2014 | Luna |
| 2014/0323036 | A1 | 10/2014 | Daley et al. |
| 2015/0091691 | A1 | 4/2015 | Calatayud |
| 2015/0092947 | A1 | 4/2015 | Gossain et al. |
| 2015/0100991 | A1 | 4/2015 | Risberg et al. |
| 2015/0135108 | A1 | 5/2015 | Pope et al. |
| 2015/0163788 | A1 | 6/2015 | Karunakaran |
| 2015/0212788 | A1 | 7/2015 | Lang |
| 2015/0237424 | A1* | 8/2015 | Wilker .................. H04R 1/323 381/150 |
| 2015/0264509 | A1 | 9/2015 | Oishi et al. |
| 2015/0312608 | A1 | 10/2015 | Higa et al. |

(56) References Cited

U.S. PATENT DOCUMENTS

| | | | |
|---|---|---|---|
| 2016/0011590 | A1 | 1/2016 | Griffiths et al. |
| 2016/0011848 | A1 | 1/2016 | Wilberding et al. |
| 2016/0011850 | A1 | 1/2016 | Sheen et al. |
| 2016/0014512 | A1 | 1/2016 | Wilberding et al. |
| 2016/0014535 | A1 | 1/2016 | Wilberding et al. |
| 2016/0014536 | A1 | 1/2016 | Sheen |
| 2016/0026428 | A1 | 1/2016 | Morganstern et al. |
| 2016/0026429 | A1 | 1/2016 | Triplett |
| 2016/0162252 | A1 | 6/2016 | Di Censo et al. |
| 2016/0191584 | A1 | 6/2016 | Dickow et al. |
| 2016/0212178 | A1 | 7/2016 | Zhang et al. |
| 2017/0019742 | A1 | 1/2017 | Rappoport |
| 2017/0034648 | A1 | 2/2017 | Hutchings et al. |
| 2017/0090134 | A1 | 3/2017 | Williams et al. |
| 2017/0117754 | A1 | 4/2017 | Noori et al. |
| 2017/0134871 | A1 | 5/2017 | Rappoport |
| 2017/0285788 | A1 | 10/2017 | Park et al. |
| 2017/0366937 | A1 | 12/2017 | Lee et al. |
| 2017/0373537 | A1 | 12/2017 | Dayal et al. |

FOREIGN PATENT DOCUMENTS

| | | | |
|---|---|---|---|
| EP | 3320698 | A1 | 5/2018 |
| WO | 200153994 | | 7/2001 |
| WO | 2003093950 | A2 | 11/2003 |

OTHER PUBLICATIONS

Notice of Allowance mailed on Jul. 19, 2017, issued in connection with U.S. Appl. No. 15/338,785, filed Oct. 31, 2016, 10 pages.

Notice of Allowance mailed on Oct. 20, 2021, issued in connection with U.S. Appl. No. 17/228,114, filed Apr. 12, 2021, 12 pages.

Notice of Allowance mailed on Jun. 21, 2017, issued in connection with U.S. Appl. No. 15/357,548, filed Nov. 21, 2016, 7 pages.

Notice of Allowance mailed on Sep. 21, 2022, issued in connection with U.S. Appl. No. 16/944,797, filed Jul. 31, 2020, 9 pages.

Notice of Allowance mailed on Mar. 23, 2020, issued in connection with U.S. Appl. No. 16/367,808, filed Mar. 28, 2019, 7 pages.

Notice of Allowance mailed on Jan. 25, 2018, issued in connection with U.S. Appl. No. 15/078,300, filed Jan. 25, 2018, 5 pages.

Notice of Allowance mailed on Aug. 27, 2018, issued in connection with U.S. Appl. No. 15/688,137, filed Aug. 28, 2017, 7 pages.

Notice of Allowance mailed on Jan. 27, 2023, issued in connection with U.S. Appl. No. 17/548,878, filed Dec. 13, 2021, 7 pages.

Notice of Allowance mailed on Jan. 28, 2016, issued in U.S. Appl. No. 14/631,713, filed Feb. 25, 2015,6 pages.

Notice of Allowance mailed on Jan. 28, 2016, issued in U.S. Appl. No. 14/631,723, filed Feb. 25, 2015, 6 pages.

Notice of Allowance mailed on Aug. 29, 2019, issued in connection with U.S. Appl. No. 16/011,273, filed Jun. 18, 2018, 11 pages.

Notice of Allowance mailed on Dec. 31, 2018, issued in connection with U.S. Appl. No. 16/180,952, filed Nov. 5, 2018, 8 pages.

Notice of Allowance mailed on Aug. 6, 2020, issued in connection with U.S. Appl. No. 15/078,006, filed Mar. 23, 2016, 7 pages.

Notice of Allowance mailed on Dec. 7, 2020, issued in connection with U.S. Appl. No. 16/693,560, filed Nov. 25, 2019, 7 pages.

Palm, Inc., "Handbook for the Palm VII Handheld," May 2000, 311 pages.

Preinterview First Office Action mailed on Sep. 23, 2016, issued in connection with U.S. Appl. No. 14/803,094, filed Jul. 19, 2015, 5 pages.

Presentations at WinHEC 2000, May 2000, 138 pages.

Roland Corporation, "Roland announces BA-55 Portable PA System," press release, Apr. 6, 2011, 2 pages.

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.0 Owner's Manual; Copyright 2008, 501 pages.

Yamaha DME Designer 3.5 setup manual guide; copyright 2004, 16 pages.

Yamaha DME Designer 3.5 User Manual; Copyright 2004, 507 pages.

Advisory Action mailed on Jul. 13, 2017, issued in connection with U.S. Appl. No. 15/078,300, filed Mar. 23, 2016, 3 pages.

AudioTron Quick Start Guide, Version 1.0, Mar. 2001, 24 pages.

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

Dempsey, Paul. The Teardown Apple Watch. Apple makes every square inch of real estate in the Watch do a job. Engineering & Technology: Reviews Consumer Technology. Jul. 2015, 2 pages.

"Denon 2003-2004 Product Catalog," Denon, 2003-2004, 44 pages.

European Patent Office, European EPC Article 94.3 mailed on Mar. 7, 2022, issued in connection with European Application No. 20163524.0, 6 pages.

European Patent Office, European Extended Search Report mailed on May 18, 2020, issued in connection with European Application No. 20163524.0, 9 pages.

European Patent Office, European Office Action mailed on Jun. 4, 2019, issued in connection with European Application No. 16748400.5, 6 pages.

European Patent Office, European Office Action mailed on Aug. 9, 2018, issued in connection with European Application No. 16748400.5, 4 pages.

European Patent Office, European Search Report mailed on Nov. 11, 2022, issued in connection with European Application No. 21210296.6, 10 pages.

European Patent Office, Office Action mailed on Jan. 18, 2018, issued in connection with European Patent Application No. 16711922.1, 6 pages.

European Patent Office, Summons to Attend Oral Proceedings mailed on Nov. 7, 2018, issued in connection with European Application No. 16711922.1, 13 pages.

Final Office Action mailed on May 1, 2017, issued in connection with U.S. Appl. No. 15/078,300, filed Mar. 23, 2016, 13 pages.

First Action Interview Office Action mailed on Oct. 16, 2015, issued in U.S. Appl. No. 14/631,713, filed Feb. 25, 2015, 5 pages.

First Action Interview Office Action mailed on Oct. 23, 2015, issued in U.S. Appl. No. 14/631,723, filed Feb. 25, 2015, 5 pages.

Goldheart, Andrew. Apple Watch X-ray Teardown. IFIXIT, May 6, 2015, 19 pages.

Horwitz, Jeremy, "Logic3 i-Station25," retrieved from the internet: http://www.ilounge.com/index.php/reviews/entry/logic3-i-station25/, last visited Dec. 17, 2013, 5 pages.

International Bureau, International Preliminary Report on Patentability and Written Opinion, mailed on Jan. 23, 2018, issued in connection with International Application No. PCT/US2016/042822, filed on Jul. 18, 2016, 8 pages.

International Bureau, International Preliminary Report on Patentability mailed on Jan. 30, 2014, issued in connection with International Application No. PCT/US2012/045894, filed on Jul. 9, 2012, 6 pages.

International Bureau, International Search Report and Written Opinion mailed on Sep. 3, 2020, issued in connection with International Application No. PCT/US2020/036409, filed on Jun. 5, 2020, 20 pages.

(56) References Cited

OTHER PUBLICATIONS

International Search Authority, International Search Report and Written Opinion mailed on Oct. 18, 2016, issued in connection with International Application No. PCT/US2016/042822, filed on Jul. 18, 2016, 13 pages.
International Searching Authority, International Search Report and Written Opinion mailed on May 25, 2016, issued in connection with International Application No. PCT/US2016/019325, filed on Feb. 24, 2016, 11 pages.
International Searching Authority, International Search Report mailed on Dec. 26, 2012, issued in connection with International Application No. PCT/US2012/045894, filed on Jul. 9, 2012, 3 pages.
International Searching Authority, Written Opinion mailed on Dec. 26, 2012, issued in connection with International Application No. PCT/US2012/045894, filed on Jul. 9, 2012, 4 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Feb. 1, 2016, issued in connection with U.S. Appl. No. 14/337,536, filed Jul. 22, 2014, 9 pages.
Non-Final Office Action mailed on Jul. 7, 2022, issued in connection with U.S. Appl. No. 17/548,878, filed Dec. 13, 2021, 6 pages.
Non-Final Office Action mailed on Mar. 10, 2017, issued in connection with U.S. Appl. No. 15/357,548, filed Nov. 21, 2016, 6 pages.
Non-Final Office Action mailed on Feb. 14, 2017, issued in connection with U.S. Appl. No. 15/338,785, filed Oct. 31, 2016, 7 pages.
Non-Final Office action mailed on Nov. 15, 2016, issued in connection with U.S. Appl. No. 15/078,300, filed Mar. 23, 2016, 8 pages.
Non-Final Office Action mailed on Feb. 16, 2022, issued in connection with U.S. Appl. No. 17/114,010, filed Dec. 7, 2020, 8 pages.
Non-Final Office Action mailed on May 16, 2018, issued in connection with U.S. Appl. No. 15/078,006, filed Mar. 23, 2016, 10 pages.
Non-Final Office Action mailed on Apr. 2, 2018, issued in connection with U.S. Appl. No. 15/688,137, filed Aug. 28, 2017, 8 pages.
Non-Final Office Action mailed on Aug. 22, 2017, issued in connection with U.S. Appl. No. 15/078,300, filed Mar. 23, 2016, 9 pages.
Non-Final Office Action mailed on Apr. 27, 2023, issued in connection with U.S. Appl. No. 17/938,601, filed Oct. 6, 2022, 8 pages.
Non-Final Office Action mailed on Jul. 29, 2020, issued in connection with U.S. Appl. No. 16/693,560, filed Nov. 25, 2019, 8 pages.
Non-Final Office Action mailed on Sep. 29, 2017, issued in connection with U.S. Appl. No. 14/844,253, filed Sep. 3, 2015, 17 pages.
Non-Final Office Action mailed on Feb. 4, 2019, issued in connection with U.S. Appl. No. 15/078,006, filed Mar. 23, 2016, 13 pages.
Non-Final Office Action mailed on Feb. 4, 2020, issued in connection with U.S. Appl. No. 15/078,006, filed Mar. 23, 2016, 10 pages.
Non-Final Office Action mailed on Aug. 6, 2019, issued in connection with U.S. Appl. No. 15/078,006, filed Mar. 23, 2016, 7 pages.
Notice of Allowance mailed on Aug. 1, 2016, issued in connection with U.S. Appl. No. 14/337,536, filed Jul. 22, 2014, 9 pages.
Notice of Allowance mailed on Jun. 8, 2022, issued in connection with U.S. Appl. No. 17/114,010, filed Dec. 7, 2020, 9 pages.
Notice of Allowance mailed on Feb. 16, 2018, issued in connection with U.S. Appl. No. 14/844,253, filed Sep. 3, 2015, 7 pages.

* cited by examiner

800A

| | | |
|---|---|---|
| Playback Device 110 | Living Room | Surround Subwoofer |
| Playback Device 112 | | |
| Playback Device 114 | | |
| Playback Device 116 | Bathroom | |
| Playback Device 118 | Office | |
| Playback Device 120 | Bedroom | |
| Playback Device 122 | Master Bedroom | Stereo Right |
| Playback Device 124 | Master Bedroom | Stereo Left |
| Device Base 132 | Living Room | Surround Rear |
| Device Base 134 | Living Room | Surround Rear |
| Device Base 136 | Dining Room | |
| Device Base 138 | Kitchen | |
| | | |
| | | |
| | | |
| | | |
| | | |
| | | |

FIGURE 8A

800B

| | Zone Property | |
|---|---|---|
| **Device/Device Base** | **Zone** | **Role** |
| Playback Device 102 | Balcony | |
| Playback Device 104 | Living Room | Surround Front |
| Playback Device 106 | Living Room | Surround Rear |
| Playback Device 108 | Living Room | Surround Rear |
| Playback Device 110 | Living Room | Surround Subwoofer |
| Playback Device 112 | Dining Room | |
| Playback Device 114 | Kitchen | |
| Playback Device 116 | Bathroom | |
| Playback Device 118 | Office | |
| Playback Device 120 | Bedroom | |
| Playback Device 122 | Master Bedroom | Stereo Right |
| Playback Device 124 | Master Bedroom | Stereo Left |
| Device Base 132 | Living Room | Surround Rear |
| Device Base 134 | Living Room | Surround Rear |
| Device Base 136 | Dining Room | |
| Device Base 138 | Kitchen | |

FIGURE 8B

PLAYBACK DEVICE BASE

CROSS REFERENCE TO RELATED APPLICATIONS

This application is a continuation of U.S. application Ser. No. 16/944,797, titled "Playback Device Base," filed on Jul. 31, 2020, and currently pending; U.S. application Ser. No. 16/944,797 is a continuation of U.S. application Ser. No. 16/367,808, titled "Stereo Pairing With Device Base," filed on Mar. 28, 2019, and issued as U.S. Pat. No. 10,735,878, on Aug. 4, 2020; U.S. application Ser. No. 16/367,808 is a continuation of U.S. application Ser. No. 16/180,952, titled "Properties Based on Device Base," filed on Nov. 5, 2018, and issued as U.S. Pat. No. 10,264,376 on Apr. 16, 2019; U.S. application Ser. No. 16/180,952 is a continuation of U.S. application Ser. No. 15/688,137, titled "Base Properties in a Media Playback System," filed on Aug. 28, 2017, and issued as U.S. Pat. No. 10,129,673 on Nov. 13, 2018; U.S. application Ser. No. 15/688,137 is a continuation of U.S. application Ser. No. 15/357,548, titled "Base Properties in a Media Playback System," filed on Nov. 21, 2016, and issued as U.S. Pat. No. 9,749,761 on Aug. 29, 2017; and U.S. application Ser. No. 15/357,548 is a continuation of U.S. application Ser. No. 14/803,094, titled "Base Properties in a Media Playback System," filed on Jul. 19, 2015, and issued as U.S. Pat. No. 9,544,701 on Jan. 10, 2017.

The entire contents of U.S. application Ser. Nos. 16/944,797; 16/367,808; 16/180,952; 15/688,137; 15/357,548; and 14/803,094 are incorporated herein by reference.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 8A is a table representing a configuration of zone properties within an example media playback system;

FIG. 8B is a table representing another configuration of zone properties within an example media playback system;

Figure 1:
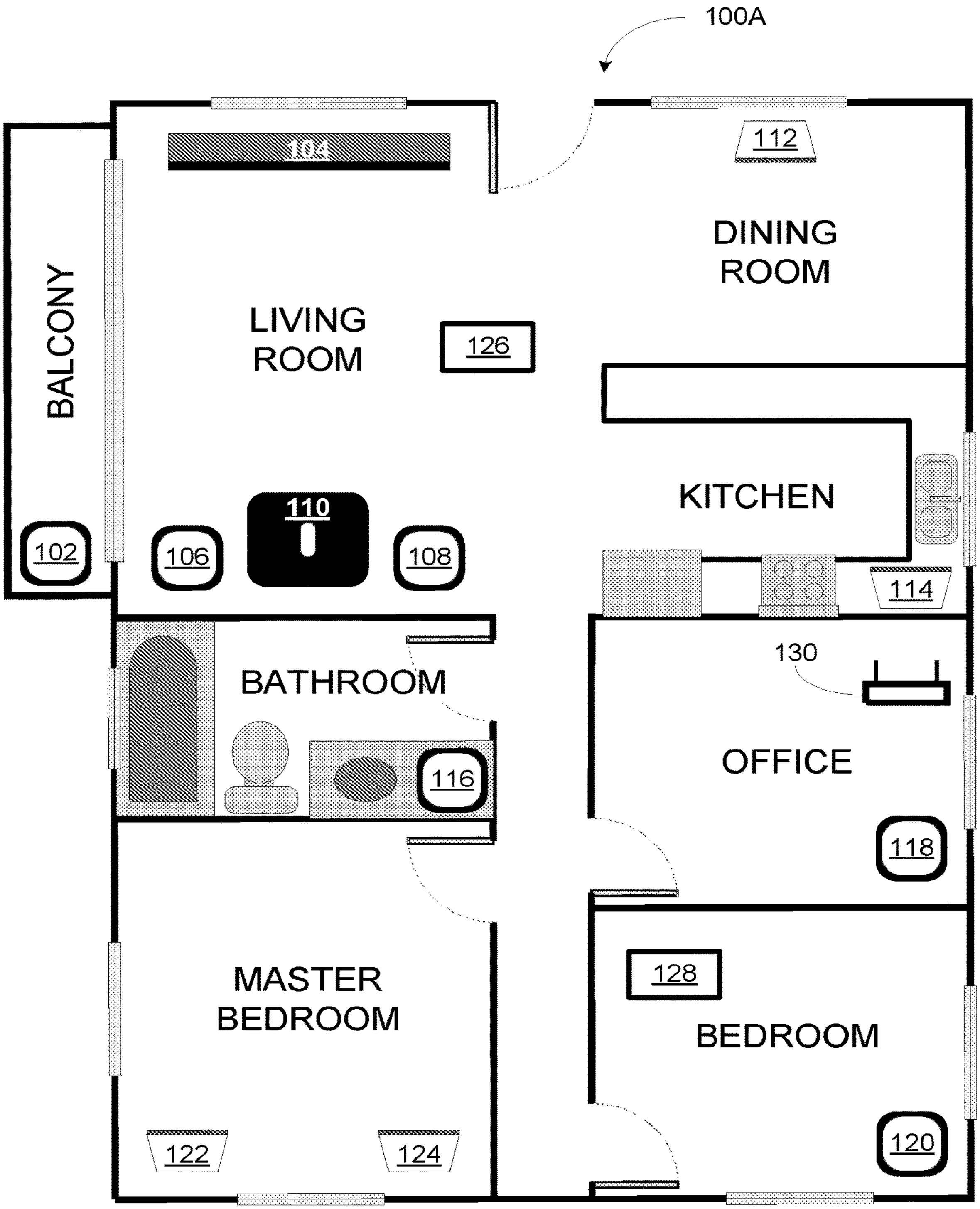
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Embodiments described herein involve, inter alia, a playback device of a media playback system acquiring a zone property from a device base. Zone properties may define how a playback device operates as part of a given zone of a media playback system. For instance, a playback device may acquire a zone property that causes the playback device to join a particular zone when the playback device is placed on a particular device base. Conversely, the playback device may lose the zone property and leave the zone when the playback device is removed from the device base. Such functionality of a playback device with respect to a device base may facilitate a playback device operating both at times as a stationary playback device and at other times as a portable playback device.

A device of a media playback system, such as a playback device or a control device, may assign a zone property to a device base. For instance, a given device base may be assigned the characteristic of "right" channel in a stereo pair that belongs to the "Den" zone. Upon being placed on the given device base, a playback device may acquire this zone property such that the playback device operates as the "right" channel in the stereo pair that belongs to the "Den" zone. As another example, a given device base may be assigned the zone property of the "Living Room" zone such that a playback device placed on that device base will assign itself that zone property and join the "Living Room" zone. As a member of the Living Room zone, the playback device may playback media in synchrony with other playback devices that are members of other zones that have been grouped into a zone group with the Living Room zone.

As noted above, assigning a zone property to a playback device may cause a playback device to join a particular zone. Further, by acquiring a particular zone property, a playback device may assume a particular role within that zone, such as a channel of a stereo pair, or possibly a channel of a surround sound configuration. Yet further, in some examples, an example zone may be associated with a pre-existing queue of media items such that by acquiring the particular zone property of the example zone, the playback device adopts the pre-existing queue of media items as its queue. In some cases, the example zone may be grouped with one or more additional zones into a zone group that is associated with a pre-existing queue of media items. Then, the playback device may play back the adopted queue of media items in synchrony with other playback devices of the grouped zones.

When a playback device is removed from a given device base, the playback device may lose the zone property that the device acquired from the device base. Further, the playback device may be assigned another zone property, which might be a zone property that is associated with playback devices that are not docked (e.g., a portable device zone). Upon being replaced onto the given device base, the playback device may be assigned the original zone property that the device acquired from the device base.

In one example, two playback devices are placed on a first device base and a second device base, respectively. These devices acquire respective first zone properties from these bases that configure the playback devices as channels of a stereo pair in a "Living Room" zone. Later, the playback devices might be removed from their respective bases and as a result, lose the "Living Room" zone configuration and be assigned second zone properties that cause the playback devices to join a different zone (e.g., a "Portable" zone). After use as portable speakers, the playback devices are returned to the bases and acquire again the zone properties that configure the playback devices as respective channels of the stereo pair in the "Living Room" zone.

As noted above, some example playback device may be used as portable speakers when removed from a device base. To facilitate such use, such playback devices may include a power storage system, which may include one or more batteries. Some devices bases may operate as charging bases such that a playback device charges its battery(s) from current delivered by the charging base while the playback device is placed on the charging base.

In some cases, a playback device may modify the zone property of a device base. For example, a device base may be moved from a den to a kitchen. In this situation, a control device may send a command indicating this change to a playback device that is placed on the device base. In this situation, the playback device placed upon the device base in the Kitchen zone may assign to the device base a zone property that is associated with a "Kitchen" zone. Thereafter, playback devices placed on that device base may acquire the zone property of the "Kitchen" zone and responsively join the Kitchen zone.

As indicated above, example techniques may involve a playback device acquiring a zone property from a device base. In one aspect, a method is provided. The method may involve identifying a particular base onto which the playback device is placed. The method may further involve determining that the particular base is assigned a zone property that is associated with a first zone of a media playback system. The method may also involve assigning, to the playback device, the zone property that is assigned to the particular base. Assigning the zone property to the playback device may involve joining the playback device into the first zone of the media playback system.

In another aspect, a device is provided. The device includes one or more processors; and a data storage having stored therein instructions executable by the one or more processors to cause the playback device to perform operations. The operations may include identifying a particular base onto which the playback device is placed. The operations may further include determining that the particular base is assigned a zone property that is associated with a first zone of a media playback system. The operations may also include assigning, to the playback device, the zone property that is assigned to the particular base. Assigning the zone property to the playback device may involve joining the playback device into the first zone of the media playback system.

In yet another aspect, a non-transitory computer readable memory is provided. The non-transitory computer readable memory has stored thereon instructions executable by a computing device to cause the computing device to perform operations. The operations may include identifying a particular base onto which the playback device is placed. The operations may further include determining that the particular base is assigned a zone property that is associated with a first zone of a media playback system. The operations may also include assigning, to the playback device, the zone property that is assigned to the particular base. Assigning the zone property to the playback device may involve joining the playback device into the first zone of the media playback system.

As also indicated above, example techniques may involve a playback device assigning a zone property to a device base. In one aspect, a method is provided. The method may involve receiving an instruction that assigns a first zone property to the playback device. Assigning the first zone property to the playback device may involve joining the playback device into a first zone of a media playback system. The method may further involve identifying a base onto which the playback device is placed. The method may also involve determining that a zone property is not assigned to the identified base, and, upon determining that a zone property is not assigned to the identified base, assigning the first zone property to the identified base.

In another aspect, a device is provided. The device includes one or more processors; and a data storage having stored therein instructions executable by the one or more processors to cause the playback device to perform operations. The operations may include receiving an instruction that assigns a first zone property to the playback device. Assigning the first zone property to the playback device may involve joining the playback device into a first zone of a media playback system. The operations may further include identifying a base onto which the playback device is placed. The operations may also include determining that a zone property is not assigned to the identified base, and, upon determining that a zone property is not assigned to the identified base, assigning the first zone property to the identified base.

In yet another aspect, a non-transitory computer readable memory is provided. The non-transitory computer readable memory has stored thereon instructions executable by a computing device to cause the computing device to perform operations. The operations may include receiving an instruction that assigns a first zone property to the playback device.

Assigning the first zone property to the playback device may involve joining the playback device into a first zone of a media playback system. The operations may further include identifying a base onto which the playback device is placed. The operations may also include determining that a zone property is not assigned to the identified base, and, upon determining that a zone property is not assigned to the identified base, assigning the first zone property to the identified base.

As further indicated above, example techniques may involve a playback device modifying a zone property of a device base. In one aspect, a method is provided. The method may involve receiving an instruction that assigns a first zone property to the playback device. Assigning the first zone property to the playback device may involve joining the playback device into a first zone of a media playback system. The method may further involve identifying a base onto which the playback device is placed. The method may involve receiving an instruction that assigns a second zone property to the playback device. Assigning the second zone property to the playback device may involve withdrawing the playback device from the first zone and joining the playback device into a second zone of the media playback system. The method may also include assigning the second zone property to the identified base onto which the playback device is placed.

In another aspect, a device is provided. The device includes one or more processors; and a data storage having stored therein instructions executable by the one or more processors to cause the playback device to perform operations. The operations may include receiving an instruction that assigns a first zone property to the playback device. Assigning the first zone property to the playback device may include joining the playback device into a first zone of a media playback system. The operations may further include identifying a base onto which the playback device is placed. The operations may include receiving an instruction that assigns a second zone property to the playback device. Assigning the second zone property to the playback device may include withdrawing the playback device from the first zone and joining the playback device into a second zone of the media playback system. The operations may also include assigning the second zone property to the identified base onto which the playback device is placed.

In yet another aspect, a non-transitory computer readable memory is provided. The non-transitory computer readable memory has stored thereon instructions executable by a computing device to cause the computing device to perform operations. The operations may include receiving an instruction that assigns a first zone property to the playback device. Assigning the first zone property to the playback device may include joining the playback device into a first zone of a media playback system. The operations may further include identifying a base onto which the playback device is placed. The operations may include receiving an instruction that assigns a second zone property to the playback device. Assigning the second zone property to the playback device may include withdrawing the playback device from the first zone and joining the playback device into a second zone of the media playback system. The operations may also include assigning the second zone property to the identified base onto which the playback device is placed.

It will be understood by one of ordinary skill in the art that this disclosure includes numerous other embodiments. It will be understood by one of ordinary skill in the art that this disclosure includes numerous other embodiments. While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 illustrates an example configuration of a media playback system 100A in which one or more embodiments disclosed herein may be practiced or implemented. The media playback system 100A as shown is associated with an example home environment having several rooms and spaces, such as for example, a master bedroom, an office, a dining room, and a living room. As shown in the example of FIG. 1, the media playback system 100A includes playback devices 102-124, control devices 126 and 128, and a wired or wireless network router 130.

Further discussions relating to the different components of the example media playback system 100A and how the different components may interact to provide a user with a media experience may be found in the following sections. While discussions herein may generally refer to the example media playback system 100A, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
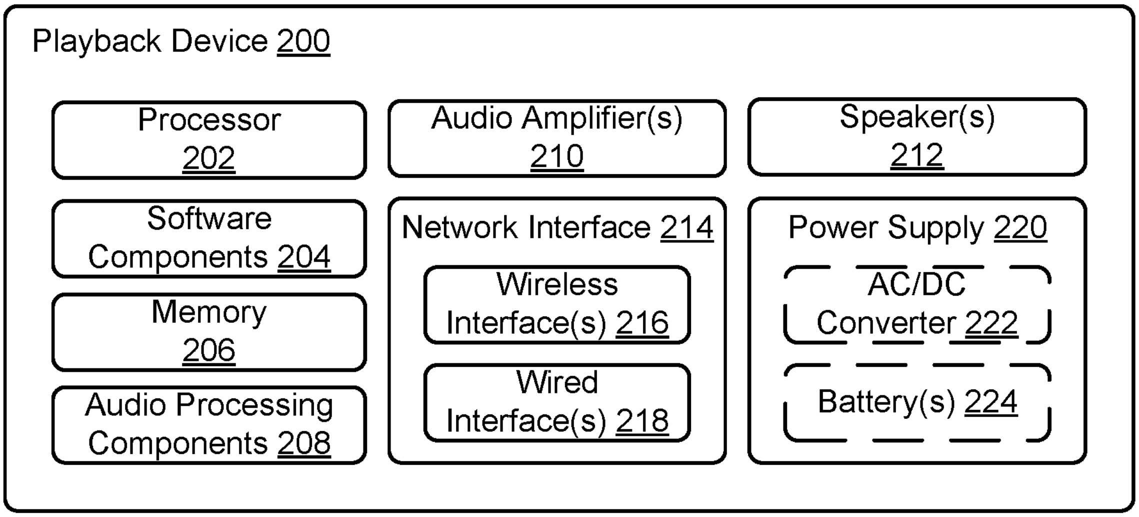
FIG. 2 shows a functional block diagram of an example playback device.

FIG. 2 shows a functional block diagram of an example playback device 200 that may be configured to be one or more of the playback devices 102-124 of the media playback system 100A of FIG. 1. The playback device 200 may include a processor 202, software components 204, memory 206, audio processing components 208, audio amplifier(s) 210, speaker(s) 212, a network interface 214 including wireless interface(s) 216 and wired interface(s) 218, and a power supply 220, which may include an AC/DC converter 222 and/or one or more batteries 224.

In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The power supply 220 may supply current to the various other components of the playback device 200. The power supply 220 may include an AC/DC converter 222, which may convert supplied alternating current to direct current used by the component of playback device 220. In some cases, playback 220 may include one or more batteries 224, which may store charge that the playback device 200 draws during portable operation.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CON- NECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100A of FIG. 1, the environment may have one or more playback zones, each with one or more playback devices. The media playback system 100A may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100A may be dynamically modified, and in some embodiments, the media playback system 100A supports numerous configurations. For instance, if a user physically moves one or more playback devices to or from a zone, the media playback system 100A may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already configured with a playback zone, a new playback zone may be created for the particular area.

Further, different playback zones of the media playback system 100A may be dynamically combined into zone groups or split up into individual playback zones. For instance, the Dining Room zone and the Kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
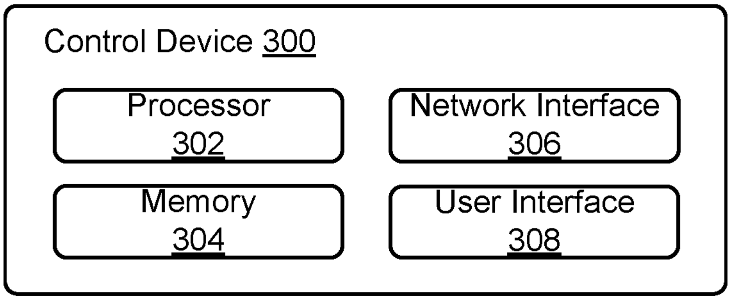
FIG. 3 shows a functional block diagram of an example control device.

FIG. 3 shows a functional block diagram of an example control device 300 that may be configured to be one or both of the control devices 126 and 128 of the media playback system 100A. Control device 300 may also be referred to as a controller 300. As shown, the control device 300 may include a processor 302, memory 304, a network interface 306, and a user interface 308. In one example, the control device 300 may be a dedicated controller for the media playback system 100A. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100A. The memory 304 may be configured to store instructions executable by the processor 302 to perform those functions. The memory 304 may also be configured to store the media playback system controller application software and other data associated with the media playback system 100A and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100A. In one example, data and information (e.g., such as a state variable) may be communicated between control device 300 and other devices via the network interface 306. For instance, playback zone and zone group configurations in the media playback system 100A may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100A may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
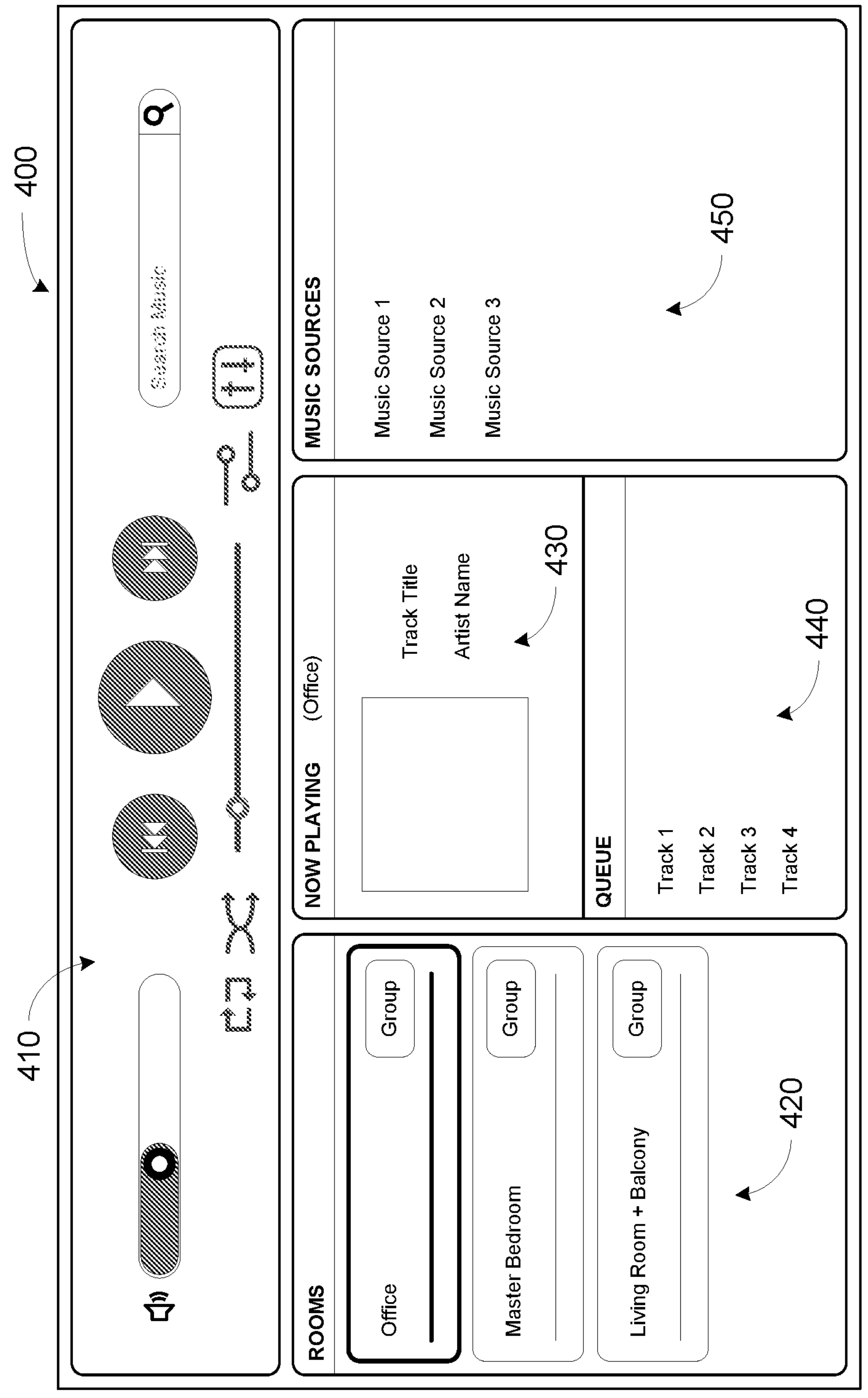
FIG. 4 shows an example controller interface.

The user interface 308 of the control device 300 may be configured to facilitate user access and control of the media playback system 100A, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100A. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100A. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100A of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100A of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

e. Example Device Base

Figure 5:
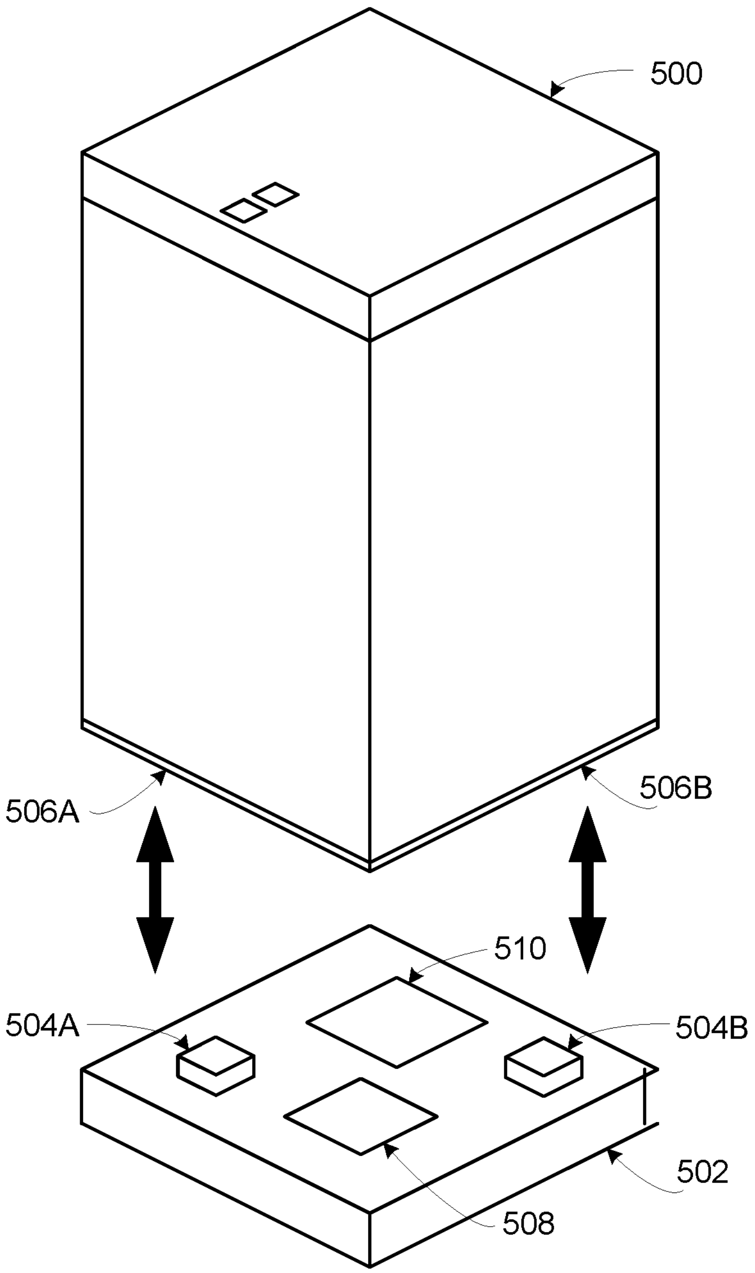
FIG. 5 shows an example playback device and an example device base.

FIG. 5 shows an example playback device 500 and an example device base 502. As shown, playback device 500 may be placed onto device base 502. Protrusions 504A and 504B may align with recesses 506A and 508B on the playback device. Such protrusions and recesses may facilitate placing the playback device 500 on the device 502 and may improve stability of the playback device while it is positioned on the device base 502.

Some device bases may include device charging systems. For instance, device base 502 includes charging system 508. When a playback device, such as playback device 500, is placed on device base 502, the playback device may draw current from charging system 508 to charge one or more of its batteries. In some embodiments, charging system 508 may include an inductive charging circuit (e.g., a coil that induces a current in a corresponding coil in the playback device that wirelessly charges one or more batteries of the playback device). Alternatively, charging system 508 may include conductive terminals by which playback device 500 may draw current from the device base 502.

In some embodiments, a device base may carry an identifier that distinguishes that device base from at least some other device bases (e.g., other device bases of a given media playback system, or perhaps other devices bases more broadly). In some implementations, the device base may passively communicate this identifier to a playback device that is placed upon the device base. For instance, a charging circuit may include a current or voltage signature (i.e., a pattern) that is unique as compared to other device bases. A playback device may use this unique signature to identify the charging base. Alternatively, a charging circuit may superimpose a signal onto the current delivered from the device base (e.g., current from the device base may include a higher frequency signal carrying the identifier of the device base). In further examples, a device base may include an RFID tag, QR code, or other identifying component that is read by the playback device when the playback device is placed upon the device base.

In some implementations, a device base includes a control system. For example, device base 502 includes control system 510. Control system 510 includes one or more processors and a memory. The processor(s) may be clock-driven computing components that process input data according to instructions stored in the memory. The memory may be a tangible computer-readable medium configured to store instructions executable by the processor(s) to cause the device base to carry out operations. Example operations include communicating via a communications interface (e.g., a BLUETOOTH® interface) with playback device 500 and causing charging system 508 to supply current to playback device 500, among other examples.

Figure 6:
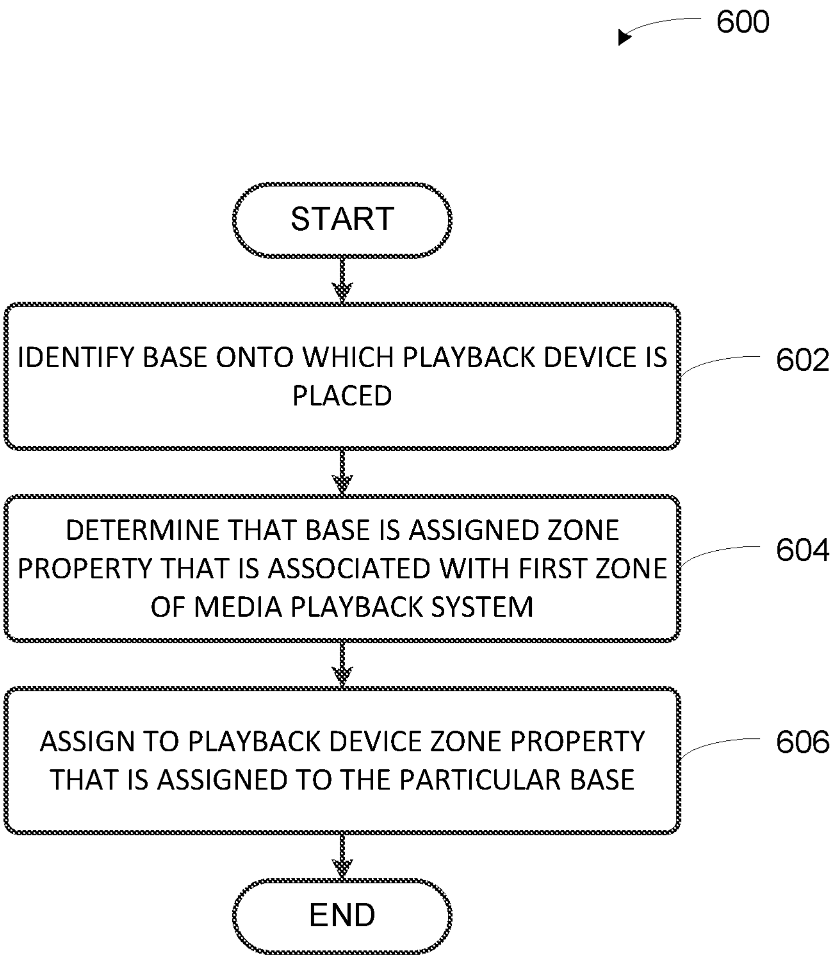
FIG. 6 shows an example flow diagram to facilitate a playback device acquiring a zone property from a device base.
Figure 10:
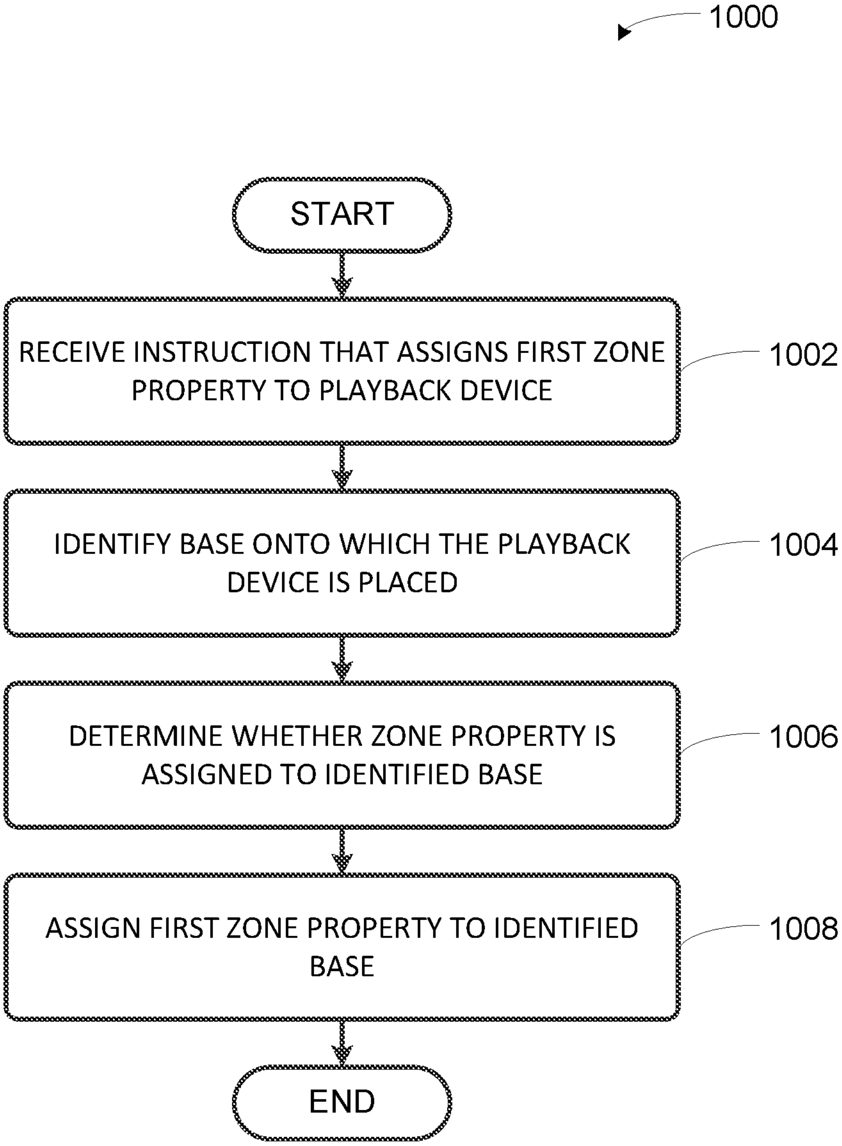
FIG. 10 shows an example flow diagram to facilitate a playback device assigning a zone property to a device base.
Figure 11:
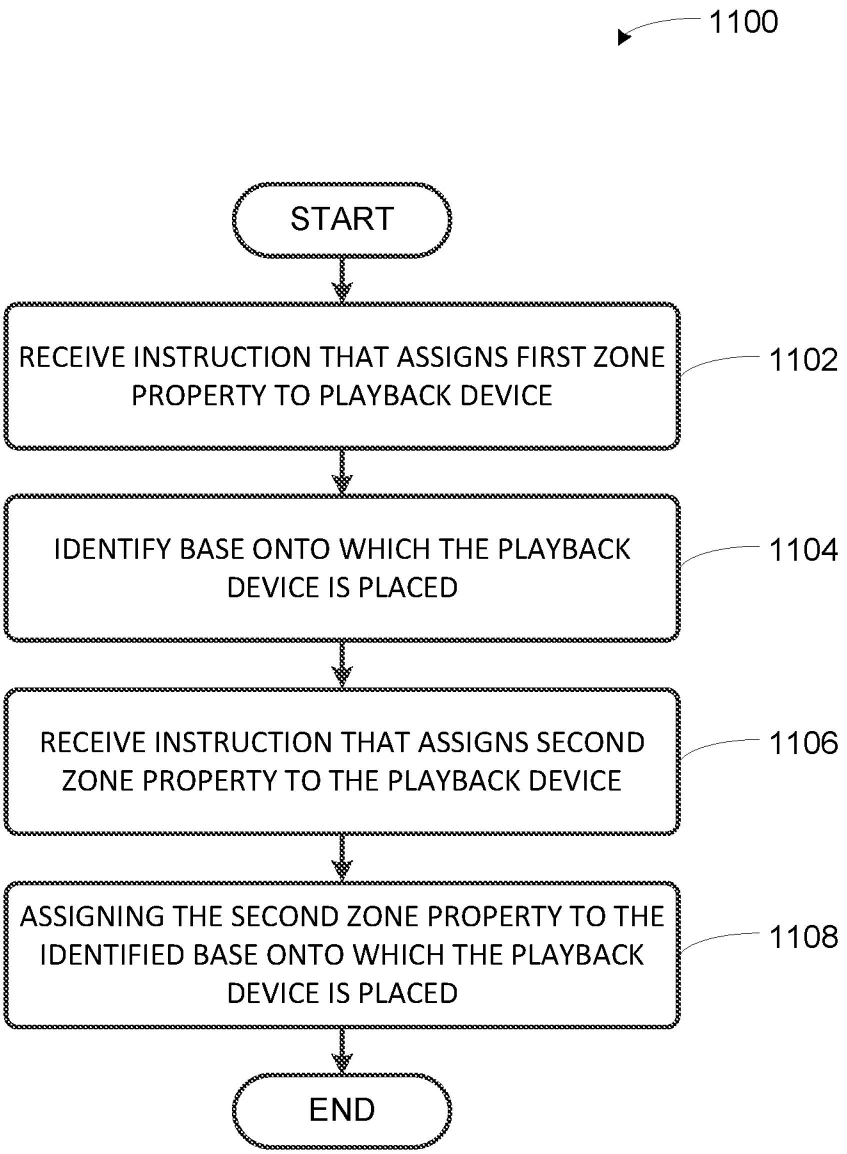
FIG. 11 shows an example flow diagram to facilitate a playback device modifying a zone property of a device base.

Moving now to several example implementations, implementations 600, 1000, and 1100 shown in FIGS. 6, 10, and 11, respectively present example embodiments of techniques described herein. These example embodiments that can be implemented within an operating environment including, for example, the media playback system 100 of FIG. 1, one or more of the playback device 200 of FIG. 2, or one or more of the control device 300 of FIG. 3. Further, operations illustrated by way of example as being performed by a media playback system can be performed by any suitable device, such as a playback device or a control device of a media playback system. Implementations 600, 1000, and 1100 may include one or more operations, functions, or actions as illustrated by one or more of blocks shown in FIGS. 6, 10, and 11. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementations disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementations disclosed herein, each block may represent circuitry that is wired to perform the specific logical functions in the process.

III. Example Techniques to Assign a Zone Property to a Playback Device

As discussed above, embodiments described herein may facilitate a playback device acquiring a zone property from a device base. By assigning a zone property to the playback device, a playback device may join a particular zone that is associated with the zone property and adopt certain characteristics of that zone. FIG. 6 illustrates an example implementation 600 by which a playback device acquires a zone property that is assigned to a base.

a. Identify a Base onto which a Playback Device is Placed

At block 602, implementation 600 involves identifying a base onto which the playback device is placed. For instance, referring to FIG. 5, playback device 500 may identify base 502 when playback device 500 is placed upon base 502. An example media playback system (e.g., media playback system 100 of FIG. 1) may include a plurality of device bases. Identifying the device base may involve determining which particular base of this plurality that the playback device is currently placed on, which may facilitate determining which zone property to assign to the playback device.

In some embodiments, a playback device may identify the device base by way of an identifier that uniquely identifies a particular base among devices of a media playback system (and possibly among all device bases from a particular manufacturer). Each device base may have such an identifier, which may be communicated to a playback device when that playback device is placed on the base. Within examples, the identifier may be stored in a data storage of the device base (e.g., a memory of control system 510 of device base 502), or the identifier may be coded into the device base (e.g., by way of a DIP switch or other logical circuitry). While several example techniques for identifying a device base are noted, other techniques for identifying a device base are contemplated as well, such as an RFID tag or QR code.

In some implementations, the identifier of the device base may be transmitted to the playback device using a radio interface (e.g., a near-field wireless communications interface such as NFC (near field communications) or BLUETOOTH® LE. For instance, while playback device 500 is placed on device base 502, control system 510 may cause a radio interface to periodically transmit the identifier of device base 502 to a corresponding radio interface of playback device 500. As noted above, a device base may use a near-field wireless communications interface, which may have a limited range such that the playback device is in range of the device base when the playback device is placed on or nearby the device base. Shielding the antenna of such a communications interface may further limit and orient its communications range, which may prevent communications between a playback device and a device base when the playback device is not on the device base.

Alternatively, the identifier of the device base may be communicated to the playback device via the charging circuit of the device base. For instance, a charging circuit may include a current or voltage signature (i.e., a pattern) that is unique as compared to other device bases. A playback device may use this unique signature to identify the charging base. Alternatively, a charging circuit may superimpose a communications signal onto the current delivered from the device base (e.g., current from the device base may include a higher frequency communications signal carrying the identifier).

Figure 7:
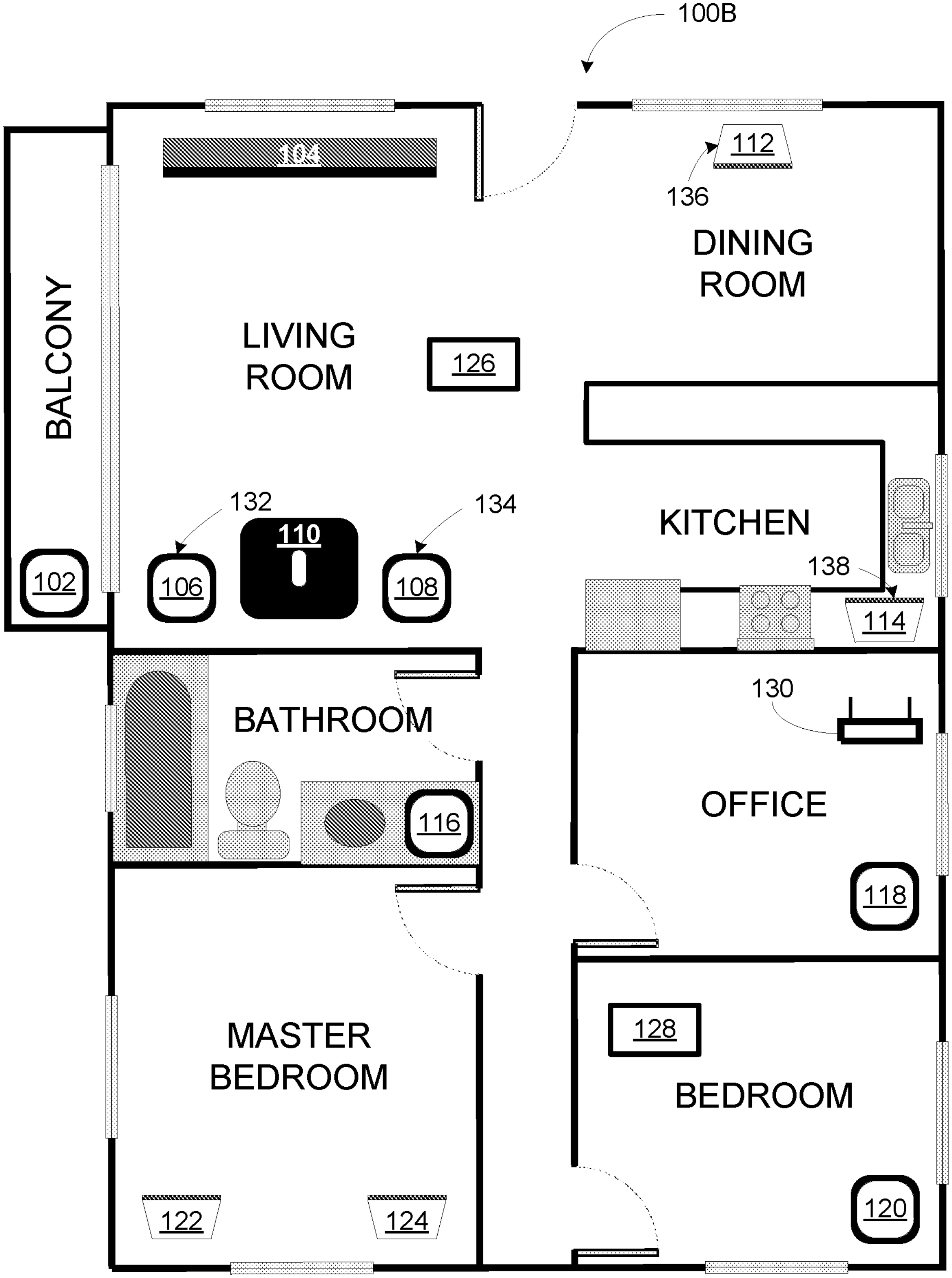
FIG. 7 shows another example media playback system configuration in which certain embodiments may be practiced.

FIG. 7 illustrates example media playback system 100B, which is another example configuration of media playback system 100A. As shown in FIG. 7, media playback system 100B includes device bases 132, 134, 136, and 138. Playback devices 106, 108, 112, and 114 are placed on device bases 132, 134, 136, and 138 respectively. When playback devices 106 and 108 are placed upon respective device bases (e.g., device base 132 and 134), playback devices 106 and 108 may identify those device bases (i.e., device base 132 and 134). Likewise, when playback device 112 is placed on a device base (e.g., device base 136), playback device 112 may identify that device base. In another example, playback device 112 may be placed on device base 136 (after playback device 114 is removed) and identify that device base.

b. Determine that the Base is Assigned a Zone Property that is Associated with a First Zone of a Media Playback System Referring back to FIG. 6, at block 604, implementation 600 involves determining that the particular base is assigned a zone property that is associated with a zone of a media playback system. For instance, after identifying device base 502, playback device 500 may determine whether a zone property is assigned to device base 502. In some cases, a zone property might not have been assigned to device base 502. However, in other cases, a zone property may have been assigned to device base 502, which may lead to playback device 500 acquiring a zone property from device base 502.

In some embodiments, a correlation between a device base and a zone property that is assigned to that device base may be stored as a state variable. A media playback system may maintain or have access to state variables that correlate device bases to assigned zone properties. To determine whether a zone property is assigned to the identified base, a playback device may refer to such state variables. For example, a playback device may access state variables stored by a media playback system to identify which zone property is assigned to a particular device base (and ultimately the zone (and/or role) of the particular device base). The media playback system may update its state variables to reflect changes to the zone or role of a device base. Similarly, correlations between playback devices and zone properties that are assigned to those playback devices may also be stored as a state variable (or multiple state variables).

FIG. 8A depicts a table 800A that indicates playback devices and device bases of media playback system 100B of FIG. 7 and their respective assigned zone properties, which may be stored as one or more state variables. As shown, some playback device of media playback system 100B are assigned a zone property, which indicates the zone to which the playback device belongs (and possibly also the playback device's role within the zone). Device bases, such as device bases 132, 134, 136, and 138, may also have an assigned zone property. After identifying the respective bases that they are placed upon, playback devices 106, 108, 112, and 114 may determine that these respective bases are assigned particular zone properties, as indicated by table 800A.

Other devices (e.g., playback devices 106, 108, 112, and 114) might not be assigned a zone property. In some embodiments, playback devices that do not have a zone property may be considered to be in a group of their own (i.e., a portable device zone). Within examples, a playback device that is in such a group may operate independently, or perhaps may operate jointly with other playback devices that are not assigned a zone property.

State variables indicating device bases of a media playback system and their respective assigned zone properties may be stored on various devices that are accessible to the media playback system. For instance, in some cases, the media playback system itself may store the state variables, perhaps in data storage of one or more playback device(s) or control device(s) of a media playback system, perhaps within a database. Alternatively, a remote server (e.g., a server that provides a cloud service) may store the state variables. Other examples are possible as well.

In some embodiments, the state variable(s) may be stored concurrently on multiple devices (e.g., on multiple devices within the media playback system), which may provide various advantages, such as redundancy and quicker access, among others. For instance, updates to the state variables stored on one playback device may be transmitted to other devices within the media playback system, so as to maintain an up-to-date instance of the state variables on multiple devices. In such cases, to determine whether a particular base is assigned a zone property that is associated with a given zone of a media playback system, a playback device may request (and receive) a state variable from one (or more) playback devices of the media playback system, perhaps by way of its network interface.

In some embodiments, determining whether a zone property is assigned to the identified base may involve querying a database for a zone property is assigned to an identifier received from the device base. For instance, playback device 500 may query a database for a zone property that is assigned to an identifier received from device base 502. In response, the playback device may receive an indication that a zone property is not assigned to the identifier received from device base 502 and responsively determine that a zone property is not assigned to device base 502. The database may include data (e.g., one or more state variables) that indicates one or more correlations between playback device and respective zone properties that are assigned to those playback devices. Within examples, the database may be stored on the playback device itself, or on another playback device of the media playback system itself. Alternatively, the database might be stored on a server that is accessible to the media playback system (e.g., a server that provides a cloud service).

c. Assign the Zone Property that is Assigned to the Base to the Playback Device

In FIG. 6, at block 606, implementation 600 involves assigning, to the playback device, the zone property that is assigned to the particular base. For instance, referring to FIG. 5, playback device 500 may be assigned a zone property that is assigned to base 502 when playback device 500 is placed upon base 502. Acquiring that zone property may cause playback device 500 to join a zone that is associated with the acquired zone property.

As noted above, assigning the zone property of the base to the playback device may cause the playback device to join a zone of a media playback system. More generally, assigning a particular zone property to a playback device may cause the playback device to join the zone that is associated with the particular zone property. For instance, a given zone property may be associated with a Living Room zone such that acquiring the given zone property causes the playback device to join the Living Room zone.

As a member of a zone, a playback device may operate as a functional unit of that zone. For instance, the zone may have its own pre-existing queue, which the playback device may adopt as its own queue. The zone may also have a pre-existing configuration defining certain operating parameters, which the playback device may adopt. For instance, the zone may have a particular equalization, which the playback device adopts upon joining the zone.

In some cases, a zone may include multiple playback devices. A zone property may define a particular role in a zone such that a playback device that is assigned the zone property assumes the particular role within the zone. For example, a given zone property may define a role as a left channel of a stereo pair such that a playback device that is assigned the zone property may begin operating as the left channel of the stereo pair. As another example, another zone property might define a role as a surround channel of a surround sound configuration such that a playback device that inherits that zone property begins operation as the surround channel.

As a member of a zone, a playback device may operate as a functional unit with other playback devices of one or more additional zones that have been joined together into a zone that a group of zones, each including respective playback device. For instance, a Living Room zone and a Den zone may be joined together into a "Living Room+Den" zone group. As a zone group, the playback devices of both zones may play media in synchrony with one another. These playback devices may share the same queue and may also adopt the same configuration.

As noted above, some playback devices may implement a queue, such that they are configured to playback media items from the queue. Further, a zone of a media playback system may be associated with a queue such the playback device of the zone plays back media items from that queue of the zone. In such embodiments, by acquiring a zone property (and joining the zone that is associated with the zone property), the playback device may adopt the pre-existing queue of the zone that is associated with the zone property. Adopting the queue may involve populating the queue of the playback device with the media items that are queued in the queue of the zone, perhaps by receiving an indication of the zone's queue from another playback device of the zone. In some instances, the playback device may remove any media items that were previously queued in its queue as part of adopting the queue of the zone, such that the playback device has a queue that matches the queue of the zone.

As noted above, in joining the zone that is associated with the zone property by acquiring the zone property, a playback device may begin to perform operations jointly with other playback devices of the zone. For instance, the playback device may play back a queue (e.g., an adopted queue) of media items in synchrony with one or more additional playback devices of the zone. Further, a playback device may perform operations jointly with playback devices of other zones that have been grouped into a zone group with the zone of the playback device. As a member of a zone or zone group, commands directed to the zone or zone group may be carried out by the playback device. For instance, commands to initiate or pause playback by the zone or zone group may be carried out by the playback device. Likewise, changes to the queue of the zone or zone group may be propagated to the playback device (e.g., if a media item is queued in the zone's queue, the playback device may playback that media item when playback of the queue reaches that media item).

Referring back to FIG. 7, playback devices 106, 108, 112, and 114 are placed upon device bases 132, 134, 136, and 138, respectively. As noted above, these playback devices may identify the respective bases that they are placed upon and determine that these bases are assigned respective zone properties that are associated with a zone. Upon making such a determination, playback devices 106, 108, 112, and 114 may acquire the zone properties that are assigned to the respective bases and join the respective zones that are associated with the acquired zone properties.

FIG. 8B depicts a table 800B that indicates playback devices and device bases of media playback system 100B of FIG. 7 and their respective assigned zone properties after playback devices 106, 108, 112, and 114 have acquired the zone properties of their respective bases. As shown, playback device 106 has acquired the zone property assigned to device base 132 and joined the Living Room zone with the role of a Surround Rear speaker. Similarly, playback device 108 has acquired the zone property assigned to device base 134 and joined the Living Room zone with the role of a Surround Rear speaker. Playback devices 112 and 114 have acquired the zone properties assigned to device base 136 and 138 respectively, which has caused playback devices 112 and 114 to join the Dining Room and Kitchen zone, respectively.

Upon being removed from a device base, a playback device may lose the zone property that is assigned to the device base. For instance, referring to FIG. 5, playback device 500 may detect its removal from device base 502 and responsively lose the zone property that is assigned to device base 502. By losing the zone property, playback device 500 may leave the zone that is associated with that zone property. In some embodiments, upon being removed from a device base that is assigned a zone property of a first zone, a playback device may acquire a zone property that is associated with a second zone such that the playback device joins the second zone. Within examples, the second zone might be a portable devices zone in which the playback device operates jointly with other playback devices that are removed from a device base.

In some cases, a playback device may acquire a zone property that is associated with a zone that does not currently include any other playback devices. In a sense, by assigning that particular zone property to the playback device, the playback device can be considered to have formed the zone that is associated with that particular zone property. By extension, when that playback device loses that zone property, the playback device may leave the zone, causing the zone to have no playback devices (given that no other playback devices had joined the zone since the playback device had joined that zone). However, the device base may retain the zone property, such that when a playback device is placed again on the device base, the zone may be formed again by that playback device when the playback device is assigned the zone property.

Referring back to FIG. 7, in one example, the Kitchen zone and the Dining Room zone are joined into a zone group such that playback device 112 (of the Dining Room zone) and playback device 114 (of the Kitchen zone) operate jointly (e.g., to play back media in synchrony). Playback device may be removed from device base 136 and carried outside to a patio (not shown). Upon being removed from device base 136, playback device 114 loses its zone property and leaves the Kitchen zone. While removed from a device base, playback device 114 operates from battery power as a portable device. As a portable device, playback device 114 might play back media from its own queue and not from any zone.

At some time thereafter, playback device 114 may be brought back in from the patio and placed back onto device base 136. Upon being placed on device base 136, playback device 114 re-joins the Kitchen zone. As a member of the Kitchen zone, playback device 114 adopts the queue of the Kitchen zone, and may also adopt a role within the Kitchen zone, as defined by the zone property assigned to device base 136. In some embodiments, upon playback device 114 re-joining the Kitchen zone, the Kitchen zone and the Dining Room zone may re-form the zone group in which playback device 112 (of the Dining Room zone) and playback device 114 (of the Kitchen zone) operate jointly that existed before playback device 114 was removed from the zone.

Figure 9A:
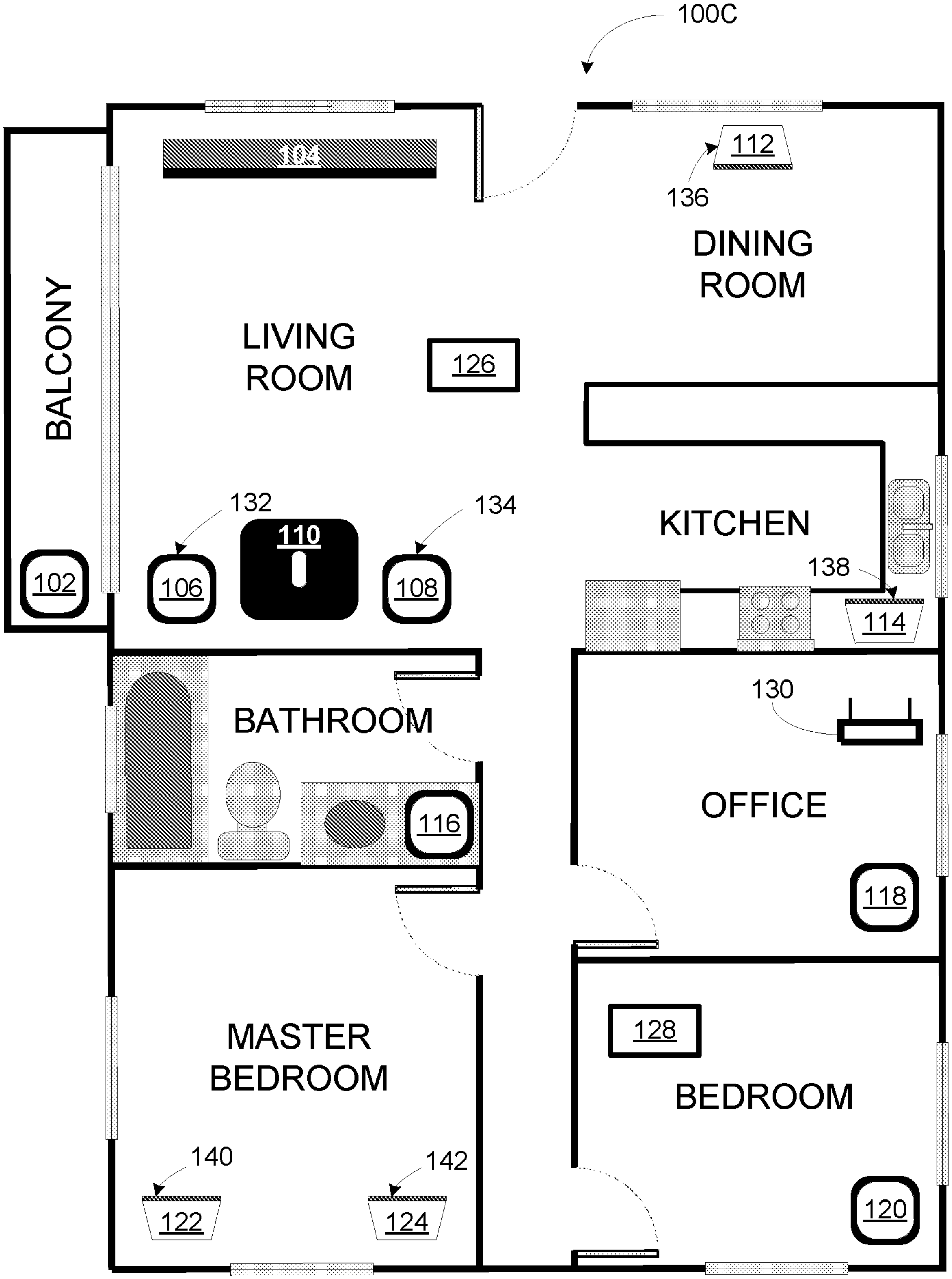
FIG. 9A shows yet another example media playback system configuration in which certain embodiments may be practiced.

FIG. 9A illustrates example media playback system 100C, which is another example configuration of media playback system 100B. In media playback system 100C, playback devices 122 and 124 are in the Master Bedroom zone and in a bonded zone configuration such that playback device 122 and playback device 124 are right and left channels of a stereo pair. As shown in FIG. 9A, playback device 122 and playback device 124 are placed upon device bases 140 and 142, respectively, which are assigned zone properties consistent with the bonded zone configuration in the Master Bedroom zone described above.

In another example, at some point, playback devices 122 and 124 are removed from device bases 140 and 142, perhaps to be taken out to a deck for a barbeque. As noted above in connection with other examples, upon removal from their respective device bases, playback devices 122 and 124 disinherit the zone properties that are assigned to those bases and become portable speakers.

Figure 9B:
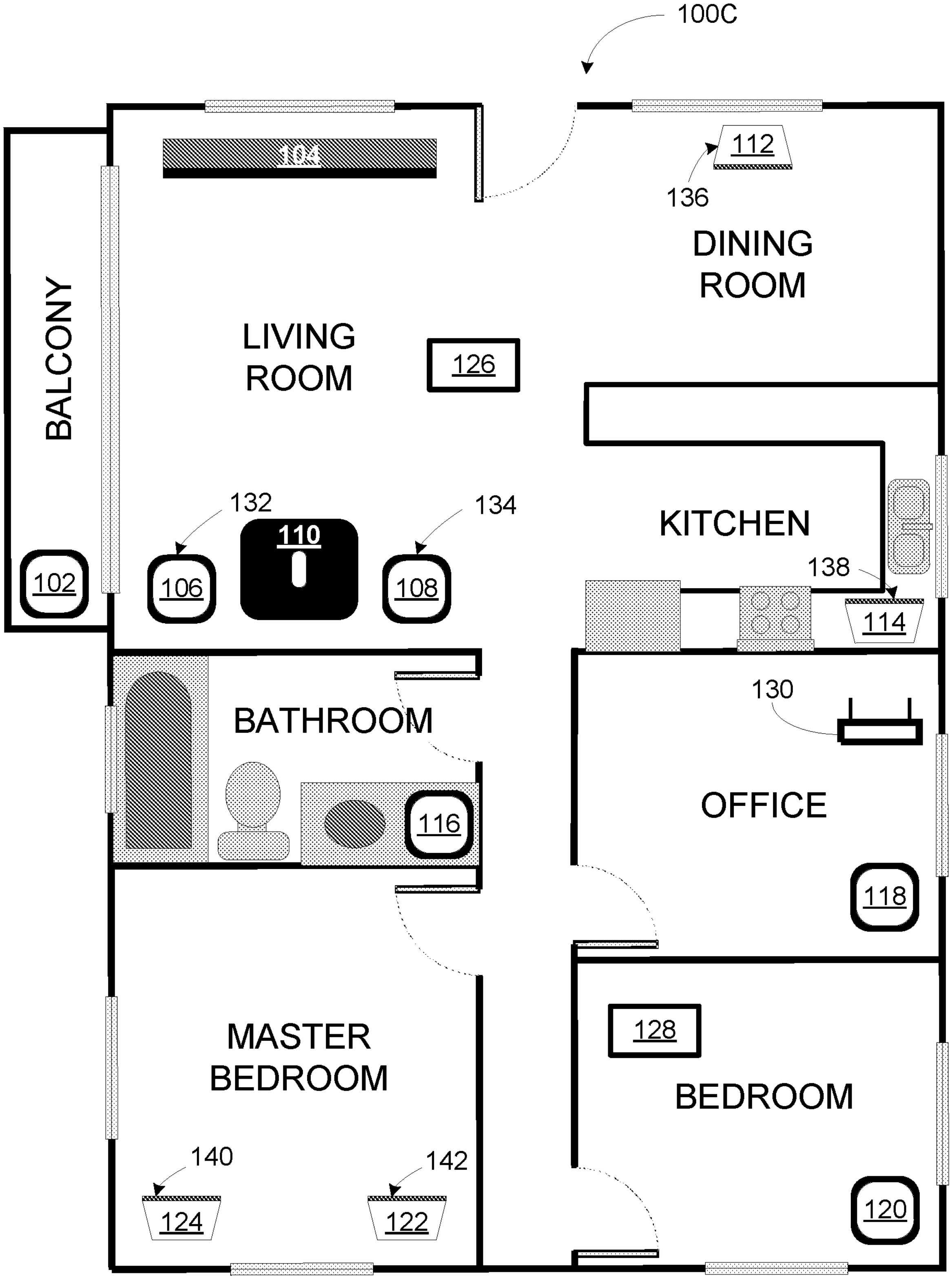
FIG. 9B shows a further example media playback system configuration in which certain embodiments may be practiced.

After use as portable speakers (e.g., after the barbeque), playback devices 122 and 124 are placed back upon device bases to recharge. However, as shown in FIG. 9B, playback device 122 and 124 switch bases as compared with their previous placement. In particular, playback device 122 is now placed upon device base 142 (instead of device base 140) and playback device 124 is placed upon device base 140 (instead of device base 142). Because each playback device acquires its zone property from the device base that it is placed upon, playback devices 122 and 124 again join the Master Bedroom zone and form a bonded zone configuration in which the playback devices are channels of a stereo pair. However, in this iteration of the bonded zone configuration, playback device 122 and playback device 124 are left and right channels, respectively (as opposed to right and left as in the previous iteration of the zone).

In some embodiments, assigning a zone property to a playback device may change the name of that playback device (perhaps by causing the playback device to join a zone having a different name). As noted above, in some implementations, zones of a media playback system may be assigned respective names. Such names may correspond to a different room or space such as an office, bathroom, master bedroom, bedroom, kitchen, dining room, living room, and/or balcony, which may help to identify a particular zone. A control device may display such a name in association with controls corresponding to that zone. For example, in playback zone region 420 of FIG. 4, controller interface 400 displays "Office", "Master Bedroom", and "Living Room+

Balcony" in connection with the Office zone, the Master Bedroom zone, and a zone group that includes the Living Room and Balcony zones.

By placing a playback device onto a device base and causing the playback device to be assigned a zone property associated with a particular zone, the name of the playback device may be changed to the name of that particular zone. For example, a given device base may be associated with a Living Room zone. Upon being placed on that device base, a playback device may join the Living Room zone, which may cause the name of the playback device to be changed to "Living Room." When the playback device is removed from that device base, the playback device may change its name again (e.g., to "Portable"). Such name changes may indicate that the playback device is a member of a particular zone, or that the playback device is operating as a portable device, among other examples.

As noted above, in some embodiments, while removed from a device base, a playback device may operate as a portable (e.g., battery powered) device, perhaps as part of a "Portable" zone. Upon being removed from a device base (and beginning to operate as a portable device), the playback device may adopt certain settings consistent with portable operations. For instance, upon being removed from a device base, the playback device may adjust its equalization to be relatively more bass focused, which may increase sound propagation in environments where the playback device is more likely to be used as a portable device (e.g., outdoors). As another example, the playback device may limit its maximum volume to a sound intensity level that is lower than the playback device is capable of emitting, which may prolong battery life of the playback device. Such a portable volume limit may be lower than a volume limit set when the playback device is placed on a device base, as operating time of the playback device might not be limited by battery capacity while on a device base. Other example settings that are consistent with portable operation might be automatically changed as well.

Example playback devices described herein may undergo a calibration procedure, which may adjust operation of a playback device for a particular location within a given environment. Some calibration procedures contemplated herein involve a control device of a media playback system detecting and analyzing sound waves (e.g., one or more calibration sounds) which were emitted by one or more playback devices of the media playback system. In some cases, such calibration sounds may facilitate the control device determining respective frequency responses of the one or more playback devices within a given environment. After determining such a response for a given playback device, the control device may instruct the given playback device to adopt a certain calibration profile (e.g., an equalization) that offsets the acoustics of the given environment. Acoustics may vary from location to location within an environment, so such a calibration procedure may tune the playback device for the particular location in the environment that the playback device was located during calibration.

In some embodiments, a calibration procedure may be performed while a given playback device is placed on a device base. This calibration may tune the playback device for the particular location in the environment at which the device base is located. Accordingly, the calibration profile determined by the calibration procedure may be attributed to the device base, as the device base may remain relatively stationary within the environment (as compared with a portable playback device). Then, when a playback device is placed upon the device base, the playback device may adopt a certain calibration profile that offsets the acoustics of the given environment at the location of the device base.

When a playback device is removed from the device base, the playback device may lose the calibration profile associated with the device base, as that calibration profile may be inapplicable for locations other than that of the device base. Further, the playback device may revert to default settings (e.g., a profile associated with portable device operation). Such a profile may include an equalization associated with operation as a portable device.

While in some cases, a playback device may be assigned a zone property upon being placed on a device base, the playback device might not immediately adopt the operating parameters or settings of the zone that is associated with the assigned zone property. Instead, the playback device may time adoption of such parameters in accordance with operations being performed by the playback device and/or the zone that the playback device is joining. For instance, the playback device might be in the process of playing a particular media item when the playback device is placed upon a device base. In such an example, the playback device might time joining the zone (or adopting operating parameters of the zone) with when the particular media item finishes playing. As another example, a given zone may include one or more other playback devices that are playing a media item, and the playback device that is joining that zone may wait to join the zone until the particular media item finishes playing.

In further examples, operating parameters or settings of the zone may be gradually applied to the device over a period of a few seconds to a minute or so. For example, upon being placed on a device base, a playback device may gradually shift from a default or portable profile (e.g. equalization) to a calibration profile associated with the device base. Such a gradual shift may prevent possibly unpleasant artifacts caused by the changing in operating parameters or settings, among other possible benefits.

Similarly, upon being removed from a device base, a playback device might not immediately adopt operating parameters or settings consistent with portable operation. Instead, the playback device may wait until the playback device stop moving (as indicated by a sensor, such as an accelerometer) to adjust operating parameters or settings. For instance, in some cases, the playback device may be removed from a first device base only to stop moving when the playback device is placed on a second device base. In such an example, the playback device might not adjust its operating parameters to be consistent with portable operation during the transition period between successive device bases. In other cases, the playback device may be removed from a device base and be placed down without being set on a device base. The playback device might then adopt settings that are consistent with portable operation.

IV. Example Techniques to Assign a Zone Property

As discussed above, embodiments described herein may facilitate a playback device assigning a zone property to a device base. A playback device may assign a zone property to a device base in various circumstances. For instance, a new (i.e., not yet configured) device base might not be assigned a zone property. Alternatively, a reset procedure (e.g., a "factory reset") might clear zone properties that have been assigned to the device base. FIG. 10 illustrates an example implementation 1000 by which a playback device assigns a zone property to a base.

a. Receive Instruction that Assigns a First Zone Property to a Playback Device

At block 1002, implementation 1000 involves receiving an instruction that assigns a first zone property to a playback device. For instance, a control device, such as control device 300 of FIG. 3, may send an instruction that assigns a zone property to a playback device, such as playback device 200 of FIG. 2. In some embodiments, the playback device receives the instruction via a network interface from the control device.

Assigning the first zone property to the playback device may involve joining the playback device into a first zone of a media playback system. As indicated above, assigning a particular zone property to a playback device may cause the playback device to join the zone that is associated with the particular zone property. For instance, a given zone property may be associated with an Office zone such that assigning the given zone property to a playback device causes the playback device to join the Office zone. Further, a zone property may define a particular role in a zone such that a playback device that is assigned the zone property assumes the particular role within the zone. For example, a given zone property may define a role as a surround channel of a surround sound configuration such that a playback device that is assigned the zone property may begin operating as a surround channel of the surround sound configuration.

As noted above, a correlation between a playback device and a zone property that is assigned to that playback device may be stored as a state variable. The media playback system may refer to the state variable to identify which zone property is assigned to a particular playback device (and ultimately the zone (and/or role) of the particular playback device). The state variable may be updated to reflect changes to the zone or role of a playback device.

Like other state variables, state variables indicating devices of a media playback system and their respective assigned zone properties may be stored in data storage of playback device(s) or control device(s) of a media playback system, perhaps within a database. In some embodiments, the state variable(s) may be stored concurrently on multiple devices within the media playback system, which may provide various advantages, such as redundancy and quicker access, among others. Updates to the state variables stored on one playback device may be transmitted to other devices within the media playback system, so as to maintain an up-to-date instance of the state variables on multiple devices. Also, as noted above, in some embodiments, the state variables may be stored on a remote server, perhaps in addition to one or more devices of the media playback system.

Within examples, the control device may send such an instruction based on detecting input indicating a request to assign the first zone property to a particular zone. For instance, a control device may cause a graphical interface to display a control interface (e.g., control interface 400 of FIG. 4). As noted above, a control interface of a control device may include controls to create/delete a zone, add/remove a playback device to/from a zone, or join two or more zones into a zone group, among other examples. Detecting a selection of a control to join a given playback device into a particular zone may cause the control device to send an instruction that assigns a particular zone property to the given playback device. Being assigned this particular zone property may cause the given playback device to join the particular zone, and possibly assume a particular role within the zone. Thereafter, by way of such a control interface, a different zone property might be assigned to the given playback device, which may cause the given playback device to leave the particular zone, and join another zone of the media playback system.

Referring back to FIG. 7, in one example, playback devices of media playback system 100B may be assigned respective zone properties. For instance, control device 126 may send one or more instructions that assign respective zone properties to playback devices 102-124. In particular, playback device 114 may receive an instruction that assigns a zone property to playback device 114 that causes playback device 114 to join the "Kitchen" zone. As another example, playback devices 106 and 108 may receive instructions that assign zone properties associated with the "Living Room" zone, which may cause playback devices 106 and 108 to join the "Living Room" zone. Further, as noted above, such zone properties may cause playback devices 106 and 108 to assume a particular role within the Living Room zone (e.g., as left and right channels of a stereo pair, or perhaps as rear channels of a surround sound system). Other examples are contemplated as well.

b. Identify a Base onto which the Playback Device is Placed

Referring back to FIG. 10, at block 1004, implementation 1000 involves identifying a base onto which the playback device is placed. For instance, referring to FIG. 5, playback device 500 may identify base 502 when playback device 500 is placed upon base 502. An example media playback system (e.g., media playback system 100 of FIG. 1) may include a plurality of device bases. Identifying the device base may involve determining which particular base of this plurality that the playback device is currently placed on, which may facilitate determining which zone property to assign to the playback device.

In FIG. 7, as one example, when playback devices 106 and 108 are placed upon respective device bases (e.g., device base 132 and 134), playback devices 106 and 108 may identify those device bases (i.e., device base 132 and 134). Likewise, when playback device 112 is placed on a device base (e.g., device base 136), playback device 112 may identify that device base. In another example, playback device 112 may be placed on device base 136 (after playback device 114 is removed) and identify that device base.

In some embodiments, a playback device may identify the device base by way of an identifier that uniquely identifies a particular base among devices of a media playback system (and possibly among all device bases from a particular manufacturer). Each device base may have such an identifier, which may be communicated to a playback device when that playback device is placed on the base. Within examples, the identifier may be stored in a data storage of the device base (e.g., a memory of control system 510 of device base 502), or the identifier may be coded into the device base (e.g., by way of a DIP switch or other logical circuitry).

In some implementations, the identifier of the device base may be transmitted to the playback device using a radio interface (e.g., a near-field wireless communications interface such as NFC (near field communications) or BLUETOOTH® LE. For instance, while playback device 500 is placed on device base 502, control system 510 may cause a radio interface to periodically transmit the identifier of device base 502 to a corresponding radio interface of playback device 500. As noted above, a device base may use a near-field wireless communications interface, which may have a limited range such that the playback device is in range of the device base when the playback device is placed on or nearby the device base. Shielding the antenna of such a communications interface may further limit and orient its communications range, which may prevent communications between a playback device and a device base when the playback device is not on the device base.

Alternatively, the identifier of the device base may be communicated to the playback device via the charging circuit of the device base. For instance, a charging circuit may include a current or voltage signature (i.e., a pattern) that is unique as compared to other device bases. A playback device may use this unique signature to identify the charging base. Alternatively, a charging circuit may superimpose a communications signal onto the current delivered from the device base (e.g., current from the device base may include a high frequency communications signal).

c. Determine that a Zone Property is not Assigned to the Identified Base

In FIG. 10, at block 1006, implementation 1000 involves determining that a zone property is not assigned to the identified base. For instance, after identifying device base 502, playback device 500 may determine whether a zone property is assigned to device base 502. In some cases, a zone property might have already been assigned to device base 502. However, in other cases, a zone property might not yet have been assigned to device base 502, which may indicate to playback device 500 that a zone property should be assigned to device base 502. As some further examples, referring to FIG. 8A, playback devices 106, 108, 112, and 114 may determine that zone properties have not been assigned to bases 126, 128, 130, and 132 respectively.

To determine whether a zone property is assigned to the identified base, a playback device may refer to a state variable. A media playback system may maintain one or more state variables that indicate one or more correlations between device bases and respective zone properties that are assigned to those playback devices. The lack of a correlation between a given device base and a zone property may indicate that a zone property is not assigned to the given device base, as such a correlation may be stored in the state variable upon a zone property being assigned to a device base.

In some embodiments, determining whether a zone property is assigned to the identified base may involve querying a database for a zone property is assigned to an identifier received from the device base. For instance, playback device 500 may query a database for a zone property that is assigned to an identifier received from device base 502. In response, the playback device may receive an indication that a zone property is not assigned to the identifier received from device base 502 and responsively determine that a zone property is not assigned to device base 502. The database may include data (e.g., one or more state variables) that indicates one or more correlations between playback device and respective zone properties that are assigned to those playback devices. Within examples, the database may be stored on the playback device itself, or on another playback device of the media playback system itself. Alternatively, the database might be stored on a server that is accessible to the media playback system (e.g., a server that provides a cloud service).

d. Assign the First Zone Property to the Identified Base

Referring again to FIG. 10, at block 1008, implementation 1000 involves assigning the first zone property to the identified base. As noted above, in some cases, a playback device may determine that a zone property has not yet been assigned to an identified base, which may indicate to the playback device that a zone property should be assigned to the device base. In some embodiments, upon determining that a zone property is not assigned to an identified base, a playback device may assign its zone property to the device base. For instance, a first zone property might be assigned to playback device 500, and, upon determining that a zone property is not assigned to device base 502, playback device 500 may assign the first zone property to device base 502.

The playback device may perform different operations depending on whether (or not) a zone property has been assigned to the device base. As noted above, if a playback device determines that a zone property is not assigned to the device base, the playback device may assign its zone property to the device base. Conversely, if a playback device determines that a zone property is assigned to the device base, the playback device may acquire the zone property of the device base.

In some embodiments, assigning a zone property to the identified base comprises updating a state variable so as to assign a zone property to the device base. For instance, the playback device may update a state variable that is stored in data storage of the playback device. In some cases, the playback device may send an indication of the update to the state variable to one or more additional playback devices of the media playback system or to a server, so as to maintain an up-to-date instance of the state variable(s) on multiple devices.

As noted above, in some cases, an identifier may uniquely identify a given base among one or more bases of the media playback system. In such cases, to assign a zone property to given base, the playback device may update a database of the playback device to associate the zone property with the identifier.

V. Example Techniques to Modify a Zone Property

As discussed above, embodiments described herein may facilitate a playback device assigning a zone property to a device base. In some cases, a playback device may modify the zone property of a device base. For instance, a device base may be moved to another area of the house, which might suggest configuring the device base with a zone property that is associated with a different zone. FIG. 11 illustrates an example implementation 1100 by which a playback device modifies a zone property that is assigned to a base.

a. Receive Instruction that Assigns a First Zone Property to a Playback Device

At block 1102, implementation 1100 involves receiving an instruction that assigns a first zone property to a playback device. For instance, referring back to FIG. 9B, control device 126 may send an instruction that assigns a zone property associated with the Kitchen zone to playback device 114, which causes playback device 114 to join the Kitchen zone, as described above.

b. Identify a Base onto which the Playback Device is Placed

At block 1104, implementation 1100 involves identifying a base onto which the playback device is placed. For instance, playback device 114 of media playback system 100C may identify device base 136, using, for example, any of the techniques to identify a device base that are noted above. Playback device 114 of media playback system 100C may determine whether a zone property is assigned to device base 136. In some cases, a zone property might not have been assigned to device base 136 and playback device 114 may proceed to assign a zone property to device base 136 as described above. In other cases, a zone property may have been assigned to device base 136, which may lead to playback device 114 acquiring a zone property from device base 136. However, in further cases, playback device 114 and device base 136 may already have the same zone property (i.e., the first zone property).

c. Receive Instruction that Assigns a Second Zone Property to a Playback Device

At block 1108, implementation 1100 involves receiving an instruction that assigns a second zone property to a playback device. The second zone property is different from the first zone property that was previously assigned to the playback device. For instance, control device 126 may send an instruction that assigns a new zone property to playback device 114. For example, playback device 114 of media playback system 100C may be moved into the dining room, and may be assigned a zone property that is associated with the Dining Room zone (rather than the Kitchen zone).

Figure 12:
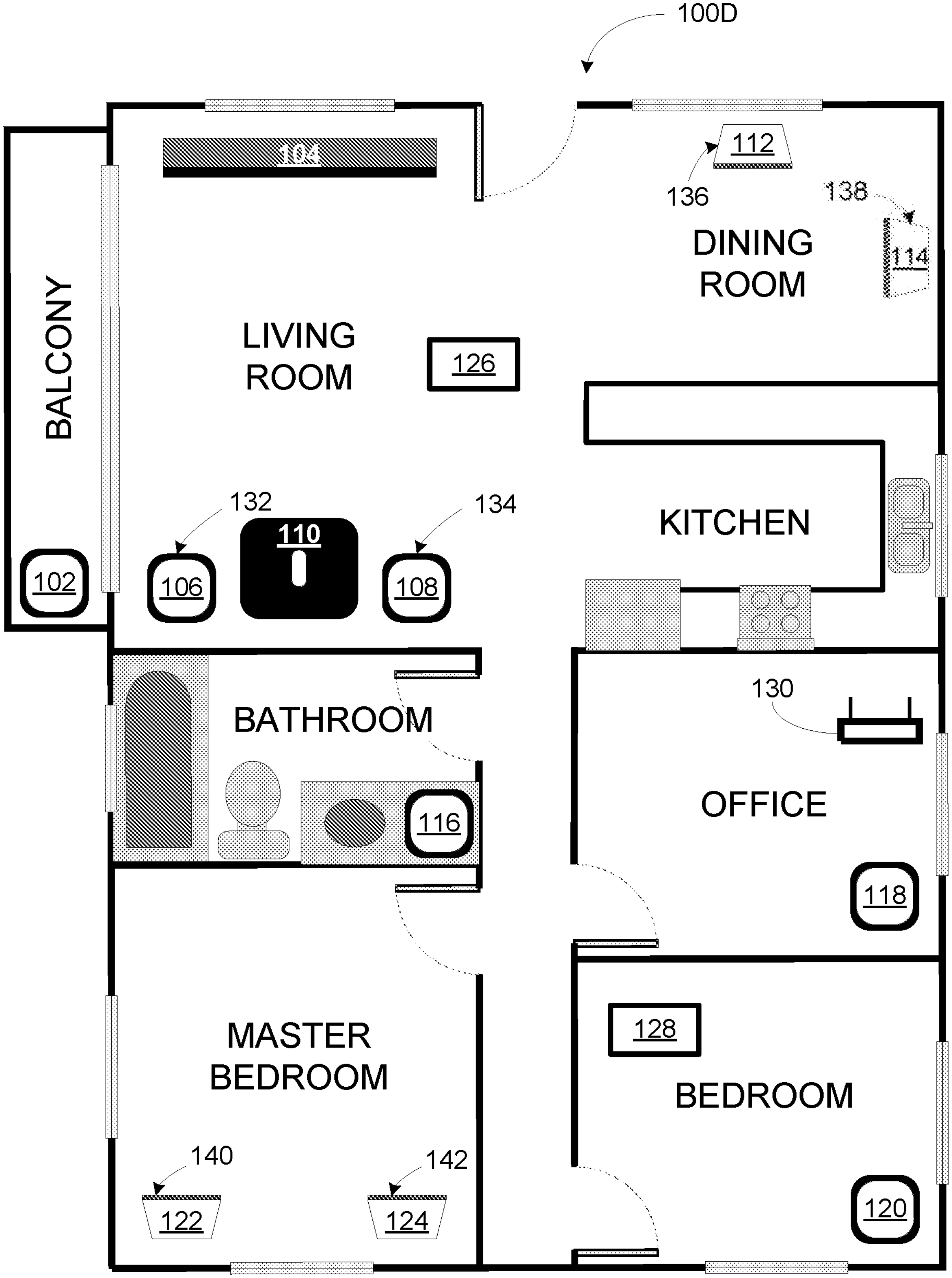
FIG. 12 shows yet another example media playback system configuration in which certain embodiments may be practiced.

To illustrate, FIG. 12 shows example media playback system 100D, which is yet another example configuration of media playback system 100B. In media playback system 100D, playback device 114 and device base 136 have been moved from the Kitchen to the Dining Room, as compared with the physical arrangement of media playback system 100B of FIG. 9A. In connection with this re-arrangement, a control device may send instruction that assigns a zone property associated with the Dining Room zone to playback device 114, so as to cause playback device 114 to join the Dining Room zone.

d. Assign the Second Zone Property to the Identified Base

At block 1110, implementation 1100 involves assigning the second zone property to the identified base onto which the playback device is placed. For instance, playback device 114 may assign the zone property that is associated with the Dining Room zone to device base 136. Playback device 114 may use any of the example techniques to assign a zone property described above, among other possible examples.

At some point in time thereafter, playback device 114 may be removed from device base 136. Playback device 114 may detect removal from device base 136, and responsively assign itself a third zone property (e.g., a zone property that is associated with a Portable zone). As described above, acquiring such a zone property may cause playback device 114 to join the zone that is associated with that zone property.

Subsequently, playback device 114 may be replaced onto device base 136. Playback device 140 may detect this replacement and responsively lose the third zone property (e.g., the zone property that is associated with a Portable zone) and acquire the second zone property (e.g., the zone property that is associated with the Dining Room zone). By assigning this zone property to playback device 114, playback device 114 may re-join the Dining Room zone.

In one example, control device 126 (or perhaps another control device, such as control device 128) may send an instruction to re-assign device base 136 from the second zone property (e.g., the zone property that is associated with the Dining Room zone) to another zone property (e.g., the zone property that is associated with the Kitchen zone). Playback device 114 may receive such an instruction and responsively assign to device base 136 the indicated zone property. If the zone property assigned to device base 136 is different from the zone property assigned to playback device 114, playback device 114 may acquire this zone property from the device base.

In further examples, a control device, such as control device 126, may assign or modify a zone property of a device base, perhaps without a playback device being placed on the device base. The control device may make such changes by updating the state variable and/or database that indicates the zone property assigned to the device base. For instance, a control device may send an instruction via its network interface to a playback device or server that is storing state variable(s) of the media playback system. The instruction may request that a particular zone property be assigned to the device base, perhaps by associated the identifier of the device base with the particular zone property.

In some cases, the device base might not be assigned a zone property. When neither the playback device nor the device base has a zone property, the playback device may wait for a zone property to be assigned to either the playback device or to the device base, perhaps by a control device. After a zone property is assigned to a device base, the playback device may be assigned that zone property. Alternatively, after a zone property is assigned to the playback device, the playback device may assign that zone property to the device base.

VI. Example Implementations

The following examples set out further or alternative aspects of the disclosure. The device in any of the following examples may be a component of any of the devices described herein or any configuration of a device described herein.

(Feature 1) A playback device configured for: identifying a particular base onto which the playback device is placed; determining whether the particular base is assigned a zone property, wherein a zone property is associated with a particular zone of a media playback system; and if it is determined that the particular base is assigned a zone property, assigning the zone property of the base to the playback device, wherein assigning a particular zone property to the playback device comprises joining the playback device into the particular zone of the media playback system that is associated with the particular zone property.

(Feature 1a) The playback device of feature 1, further configured for determining whether the playback device has a zone property assigned thereto, and when the playback device has a first zone property assigned thereto before being placed onto the particular base, assigning the zone property of the particular base comprises: assigning the zone property of the base to the playback device and disassociating the first zone property from the playback device.

Feature (1b) The playback device of feature 1, further configured for determining whether the playback device has a zone property assigned thereto, and, when it is determined that the base and the playback device do not have a zone property assigned thereto, awaiting an instruction for assigning a zone property to one or both of the playback device and the base.

(Feature 2) The playback device according to feature 1, further configured for, if it is determined that the particular base is not assigned a zone property and the playback device was assigned a zone property prior to placing the playback device onto the particular base, assigning to the particular base a zone property assigned the playback device prior to being placed onto the base.

(Feature 3) The playback device of features 1 or 2, further configured for: detecting removal of the playback device from the particular base; and in response to detecting the removal of the playback device from the particular base, assigning to the playback device a different zone property from the zone property assigned to the playback device when the playback device was located on the base.

(Feature 3a) The playback device of feature 3 in combination with feature 1, wherein the different zone property corresponds to a zone property assigned to the playback device prior to the playback device being placed on the base.

(Feature 4) The playback device of feature 3, further comprising, in response to detecting the removal of the playback device from the particular base, disassociating the playback device from the zone property that was assigned to the playback device when the playback device was placed onto the base.

(Feature 5) The playback device of feature 2 in combination with one of features 3 and 4, wherein the playback device is further configured for: detecting replacement of the playback device onto the base after detecting the removal of the playback device from the particular base; and in response to detecting the replacement of the playback device onto the identified base: disassociating the playback device from the different zone property assigned to the playback device in response to the removal of the playback device from the base; and re-associating the playback device with the zone property that was assigned to the playback device when the playback device was placed onto the base.

(Feature 6) The playback device of any of features 1 to 5, wherein identifying the particular base onto which the playback device is placed comprises receiving, from the particular base, a signal indicating an identifier of the particular base that uniquely identifies the particular base among bases of the media playback system.

(Feature 7) The playback device of feature 6, wherein determining whether the particular base is assigned a zone property comprises receiving, from another playback device within the media playback system, an identification of a zone property corresponding to the received identifier of the particular base.

(Feature 8) The playback device of feature 6, further comprising determining whether the particular base is assigned a zone property by querying a database of the playback device for a zone property associated with the received identifier.

(Feature 9) The playback device of feature 2 in combination with feature 8, wherein assigning the zone property of the playback device to the base comprises updating the database of the playback device to associate a particular zone property with the identifier that uniquely identifies the particular base.

(Feature 10) The playback device according to one of features 1 to 9, further comprising a network interface, wherein the playback device is further configured for: receiving an instruction via the network interface to assign a particular zone property to the playback device, and assigning the particular zone property to the playback device in response to the received instruction.

(Feature 11) The playback device of feature 10, further configured for, when the instruction to assign the particular zone property to the playback device is received while the playback device is located on the base, further assigning the particular zone property to the base in response to receiving the instruction.

(Feature 12) The playback device of one of features 1 to 11, further configured for: while the playback device is located on the base, receiving an instruction, from a control device of the media playback system, for assigning to the base a different zone property than a zone property assigned to the base when the instruction is received; and in response to the received instruction from the control device, assigning the different zone property to the base and to the playback device.

(Feature 13) The playback device of any preceding feature, wherein the particular zone of the zone property to which the playback device is assigned consists of the playback device.

(Feature 14) The playback device of any preceding feature, wherein, when the particular zone of the zone property to which the playback device is assigned comprises the playback device and one or more additional playback devices, assigning the particular zone property to the playback device comprises causing the playback device to play back a media item in synchrony with the one or more additional playback devices of the particular zone.

(Feature 15) The playback device of feature 14, further comprising playing back the media item as a first channel of a stereo pair, wherein an additional playback device of the particular zone plays back the media item as a second channel of the stereo pair.

(Feature 16) The playback device of any preceding feature, wherein assigning the particular zone property to the playback device comprises updating a state variable so as to cause the playback device to join the particular zone of the media playback system.

(Feature 17) The playback device of any preceding feature, wherein: the playback device is configured to play back media items in a queue, and when the particular zone is associated with a pre-existing queue of media items, assigning the particular zone property to the playback device comprises adopting the pre-existing queue of media items as the queue of the playback device.

(Feature 18) The playback device of any preceding feature, further configured for charging a battery of the playback device from current delivered through the particular base while the playback device is placed on the particular base.

VII. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, example techniques may involve a playback device acquiring a zone property from a device base. In one aspect, a method is provided. The method may involve identifying a particular base onto which the playback device is placed. The method may further involve determining that the particular base is assigned a zone property that is associated with a first zone of a media playback system. The method may also involve assigning, to the playback device, the zone property that is assigned to the particular base. Assigning the zone property to the playback device may involve joining the playback device into the first zone of the media playback system.

In another aspect, a device is provided. The device includes one or more processors; and a data storage having stored therein instructions executable by the one or more processors to cause the playback device to perform operations. The operations may include identifying a particular base onto which the playback device is placed. The operations may further include determining that the particular base is assigned a zone property that is associated with a first zone of a media playback system. The operations may also include assigning, to the playback device, the zone property that is assigned to the particular base. Assigning the zone property to the playback device may involve joining the playback device into the first zone of the media playback system.

In yet another aspect, a non-transitory computer readable memory is provided. The non-transitory computer readable memory has stored thereon instructions executable by a computing device to cause the computing device to perform operations. The operations may include identifying a particular base onto which the playback device is placed. The operations may further include determining that the particular base is assigned a zone property that is associated with a first zone of a media playback system. The operations may also include assigning, to the playback device, the zone property that is assigned to the particular base. Assigning the zone property to the playback device may involve joining the playback device into the first zone of the media playback system.

As also indicated above, example techniques may involve a playback device assigning a zone property to a device base. In one aspect, a method is provided. The method may involve receiving an instruction that assigns a first zone property to the playback device. Assigning the first zone property to the playback device may involve joining the playback device into a first zone of a media playback system. The method may further involve identifying a base onto which the playback device is placed. The method may also involve determining that a zone property is not assigned to the identified base, and, upon determining that a zone property is not assigned to the identified base, assigning the first zone property to the identified base.

In another aspect, a device is provided. The device includes one or more processors; and a data storage having stored therein instructions executable by the one or more processors to cause the playback device to perform operations. The operations may include receiving an instruction that assigns a first zone property to the playback device. Assigning the first zone property to the playback device may involve joining the playback device into a first zone of a media playback system. The operations may further include identifying a base onto which the playback device is placed. The operations may also include determining that a zone property is not assigned to the identified base, and, upon determining that a zone property is not assigned to the identified base, assigning the first zone property to the identified base.

In yet another aspect, a non-transitory computer readable memory is provided. The non-transitory computer readable memory has stored thereon instructions executable by a computing device to cause the computing device to perform operations. The operations may include receiving an instruction that assigns a first zone property to the playback device. Assigning the first zone property to the playback device may involve joining the playback device into a first zone of a media playback system. The operations may further include identifying a base onto which the playback device is placed. The operations may also include determining that a zone property is not assigned to the identified base, and, upon determining that a zone property is not assigned to the identified base, assigning the first zone property to the identified base.

As further indicated above, example techniques may involve a playback device modifying a zone property of a device base. In one aspect, a method is provided. The method may involve receiving an instruction that assigns a first zone property to the playback device. Assigning the first zone property to the playback device may involve joining the playback device into a first zone of a media playback system. The method may further involve identifying a base onto which the playback device is placed. The method may also involve determining that the first zone property is assigned to the identified base. The method may involve receiving an instruction that assigns a second zone property to the playback device. Assigning the second zone property to the playback device may involve withdrawing the playback device from the first zone and joining the playback device into a second zone of the media playback system. The method may also include assigning the second zone property to the identified base onto which the playback device is placed.

In another aspect, a device is provided. The device includes one or more processors; and a data storage having stored therein instructions executable by the one or more processors to cause the playback device to perform operations. The operations may include receiving an instruction that assigns a first zone property to the playback device. Assigning the first zone property to the playback device may include joining the playback device into a first zone of a media playback system. The operations may further include identifying a base onto which the playback device is placed. The operations may also include determining that the first zone property is assigned to the identified base. The operations may include receiving an instruction that assigns a second zone property to the playback device. Assigning the second zone property to the playback device may include withdrawing the playback device from the first zone and joining the playback device into a second zone of the media playback system. The operations may also include assigning the second zone property to the identified base onto which the playback device is placed.

In yet another aspect, a non-transitory computer readable memory is provided. The non-transitory computer readable memory has stored thereon instructions executable by a computing device to cause the computing device to perform operations. The operations may include receiving an instruction that assigns a first zone property to the playback device. Assigning the first zone property to the playback device may include joining the playback device into a first zone of a media playback system. The operations may further include identifying a base onto which the playback device is placed. The operations may also include determining that the first zone property is assigned to the identified base. The operations may include receiving an instruction that assigns a second zone property to the playback device. Assigning the second zone property to the playback device may include withdrawing the playback device from the first zone and joining the playback device into a second zone of the media playback system. The operations may also include assigning the second zone property to the identified base onto which the playback device is placed.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A portable playback device comprising:

at least one battery configured to provide power to the portable playback device;

one or more network interfaces;

one or more speakers;

one or more amplifiers configured to drive the one or more speakers;

one or more processors; and tangible, non-transitory computer-readable media comprising program instructions executable by the one or more processors such that the portable playback device is configured to:

after determining that the portable playback device has been placed on a first device base, configure the portable playback device to play audio according to a first audio calibration configuration corresponding to a first acoustic environment associated with the first device base; and after determining that the portable playback device has been removed from the first device base, configure the portable playback device to play audio content according to a second audio calibration configuration corresponding to a second acoustic environment.

2. The portable playback device of claim 1, wherein the program instructions executable by the one or more processors such that the portable playback device is configured to configure the portable playback device to play audio according to the first audio calibration configuration corresponding to the first acoustic environment comprise program instructions executable by the one or more processors such that the portable playback device is configured to configure the portable playback device to play audio according to the first audio calibration configuration in one of (i) a stereo pair configuration, wherein in the stereo pair configuration, the portable playback device is configured to play a first stereo channel of the audio while a second playback device plays a second stereo channel of the audio, or (ii) a home theater configuration, wherein in the home theater configuration, the portable playback device is configured to play a first home theater channel of the audio while one or more other playback devices play other home theater channels of the audio.

3. The portable playback device of claim 1, wherein the program instructions executable by the one or more processors such that the portable playback device is configured to configure the portable playback device to play audio content according to the second audio calibration configuration corresponding to the second acoustic environment comprise program instructions executable by the one or more processors such that the portable playback device is configured to configure the portable playback device to play audio content according to the second audio calibration configuration in one of (i) an un-grouped configuration or (ii) a portable zone configuration, wherein in the portable zone configuration, the portable playback device is configured to play audio content in a groupwise manner with one or more other portable playback devices.

4. The portable playback device of claim 1, wherein the program instructions executable by the one or more processors such that the portable playback device is configured to configure the portable playback device to play audio content according to the second audio calibration configuration corresponding to the second acoustic environment comprise program instructions executable by the one or more processors such that the portable playback device is configured to transition from the first audio calibration configuration to the second audio calibration configuration over a duration of time from between about two seconds to about one minute.

5. The portable playback device of claim 1, wherein the program instructions comprise program instructions executable by the one or more processors such that the portable playback device is configured to:

while the portable playback device is configured to play audio content according to the second audio calibration configuration, determine whether the portable playback device has been placed on the first device base; and after determining that the portable playback device has been placed on the first device base, configure the portable playback device to play audio according to the first audio calibration configuration corresponding to the first acoustic environment associated with the first device base.

6. The portable playback device of claim 1, wherein the program instructions comprise program instructions executable by the one or more processors such that the portable playback device is configured to:

while the portable playback device is configured to play audio content according to the second audio calibration configuration, determine whether the portable playback device has been placed on a second device base that is different than the first device base; and after determining that the portable playback device has been placed on the second device base, configure the portable playback device to play audio according to a third audio calibration configuration corresponding to a third acoustic environment associated with the second device base.

7. The portable playback device of claim 1, wherein the first audio calibration configuration comprises a first maximum volume setting, wherein the second audio calibration configuration comprises a second maximum volume setting, and wherein the second maximum volume setting is lower than the first maximum volume setting.

8. The portable playback device of claim 1, wherein the program instructions comprise program instructions executable by the one or more processors such that the portable playback device is configured to, when the portable playback device is configured to play audio from a first playback queue:

after determining that the portable playback device has been placed on the first device base, configure the portable playback device to play audio from a second playback queue rather than the first playback queue; and after determining that the portable playback device has been removed from the first device base, configure the portable playback device to play audio from the first playback queue rather than the second playback queue.

9. The portable playback device of claim 1, wherein the program instructions executable by the one or more processors such that the portable playback device is configured to configure the portable playback device to play audio according to the first audio calibration configuration corresponding to the first acoustic environment comprise program instructions executable by the one or more processors such that the portable playback device is configured to:

determine a device base identifier associated with the first device base; and use the device base identifier associated with the first device base to obtain the first audio calibration configuration corresponding to the first acoustic environment from a computing system separate from the portable playback device and the first device base.

10. The portable playback device of claim 1, wherein the program instructions comprise program instructions executable by the one or more processors such that the portable playback device is configured to:

after determining that the portable playback device has been placed on the first device base, configure the portable playback device to obtain power via the first device base; and after determining that the portable playback device has been removed from the first device base, configure the portable playback device to obtain power from the at least one battery.

11. Tangible, non-transitory computer-readable media comprising program instructions, wherein the program instructions, when executed, cause a portable playback device to perform functions comprising:

after determining that the portable playback device has been placed on a first device base, configuring the portable playback device to play audio according to a first audio calibration configuration corresponding to a first acoustic environment associated with the first device base; and after determining that the portable playback device has been removed from the first device base, configuring the portable playback device to play audio content according to a second audio calibration configuration corresponding to a second acoustic environment.

12. The tangible, non-transitory computer-readable media of claim 11, wherein configuring the portable playback device to play audio according to the first audio calibration configuration corresponding to the first acoustic environment comprises configuring the portable playback device to play audio according to the first audio calibration configuration in one of (i) a stereo pair configuration, wherein in the stereo pair configuration, the portable playback device is configured to play a first stereo channel of the audio while a second playback device plays a second stereo channel of the audio, or (ii) a home theater configuration, wherein in the home theater configuration, the portable playback device is configured to play a first home theater channel of the audio while one or more other playback devices play other home theater channels of the audio.

13. The tangible, non-transitory computer-readable media of claim 11, wherein configuring the portable playback device to play audio content according to the second audio calibration configuration corresponding to the second acoustic environment comprises configuring the portable playback device to play audio content according to the second audio calibration configuration in one of (i) an un-grouped configuration or (ii) a portable zone configuration, wherein in the portable zone configuration, the portable playback device is configured to play audio content in a groupwise manner with one or more other portable playback devices.

14. The tangible, non-transitory computer-readable media of claim 11, wherein configuring the portable playback device to play audio content according to the second audio calibration configuration corresponding to the second acoustic environment comprises transitioning from the first audio calibration configuration to the second audio calibration configuration over a duration of time from between about two seconds to about one minute.

15. The tangible, non-transitory computer-readable media of claim 11, wherein the functions further comprise:

while the portable playback device is configured to play audio content according to the second audio calibration configuration, determining whether the portable playback device has been placed on the first device base; and after determining that the portable playback device has been placed on the first device base, configuring the portable playback device to play audio according to the first audio calibration configuration corresponding to the first acoustic environment associated with the first device base.

16. The tangible, non-transitory computer-readable media of claim 11, wherein the functions further comprise:

while the portable playback device is configured to play audio content according to the second audio calibration configuration, determining whether the portable playback device has been placed on a second device base that is different than the first device base; and after determining that the portable playback device has been placed on the second device base, configuring the portable playback device to play audio according to a third audio calibration configuration corresponding to a third acoustic environment associated with the second device base.

17. The tangible, non-transitory computer-readable media of claim 11, wherein the first audio calibration configuration comprises a first maximum volume setting, wherein the second audio calibration configuration comprises a second maximum volume setting, and wherein the second maximum volume setting is lower than the first maximum volume setting.

18. The tangible, non-transitory computer-readable media of claim 11, wherein the functions further comprise, when the portable playback device is configured to play audio from a first playback queue:

after determining that the portable playback device has been placed on the first device base, configuring the portable playback device to play audio from a second playback queue rather than the first playback queue; and after determining that the portable playback device has been removed from the first device base, configuring the portable playback device to play audio from the first playback queue rather than the second playback queue.

19. The tangible, non-transitory computer-readable media of claim 11, wherein configuring the portable playback device to play audio according to the first audio calibration configuration corresponding to the first acoustic environment comprises:

determining a device base identifier associated with the first device base; and using the device base identifier associated with the first device base to obtain the first audio calibration configuration corresponding to the first acoustic environment from a computing system separate from the portable playback device and the first device base.

20. The tangible, non-transitory computer-readable media of claim 11, wherein the functions further comprise:

after determining that the portable playback device has been placed on the first device base, configuring the portable playback device to obtain power via the first device base; and after determining that the portable playback device has been removed from the first device base, configuring the portable playback device to obtain power from at least one battery of the portable playback device.

* * * * *